(12) United States Patent
Ang et al.

(10) Patent No.: US 9,090,169 B2
(45) Date of Patent: Jul. 28, 2015

(54) ADAPTER AND VEHICLE FOR PERFORMING POWER FEEDING USING ADAPTER

(75) Inventors: Wanleng Ang, Okazaki (JP); Ryouji Oki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 14/001,734

(22) PCT Filed: Mar. 23, 2011

(86) PCT No.: PCT/JP2011/056946
§ 371 (c)(1),
(2), (4) Date: Aug. 27, 2013

(87) PCT Pub. No.: WO2012/127648
PCT Pub. Date: Sep. 27, 2012

(65) Prior Publication Data
US 2014/0002024 A1   Jan. 2, 2014

(51) Int. Cl.
*H02J 7/00* (2006.01)
*B60L 11/18* (2006.01)
(Continued)

(52) U.S. Cl.
CPC .......... *B60L 11/1809* (2013.01); *B60L 3/0069* (2013.01); *B60L 3/04* (2013.01); *B60L 7/14* (2013.01); *B60L 11/005* (2013.01); *B60L 11/14* (2013.01); *B60L 11/1818* (2013.01); *B60L 11/1824* (2013.01); *B60L 11/1838* (2013.01); *B60L 11/1842* (2013.01); *H01R 31/06* (2013.01); *H02J 7/00* (2013.01); *H02J 7/0036* (2013.01); *B60L 2210/30* (2013.01); *B60L 2210/40* (2013.01); *B60L 2230/12* (2013.01);
(Continued)

(58) Field of Classification Search
CPC .... G01R 31/025; G01R 31/42; H02H 11/005; H02H 5/12; B60L 11/005; B60L 11/1809; B60L 11/1818; B60L 2230/12; B60L 3/0069; H01R 13/703; H02J 7/00; H02J 7/0063; Y02T 10/70
USPC ............................................................ 320/109
See application file for complete search history.

(56) References Cited

U.S. PATENT DOCUMENTS 4,974,250 A * 11/1990 Tomiyori ...................... 455/557
2006/0152192 A1   7/2006 Lee et al.
(Continued)

FOREIGN PATENT DOCUMENTS

CN           1815869 A        8/2006
JP       A-2010-35277         2/2010
(Continued)

*Primary Examiner* — Vuthe Siek
(74) *Attorney, Agent, or Firm* — Oliff PLC

(57) ABSTRACT

An adapter includes a signal generation unit and a leakage generation circuit. The signal generation unit provides a signal instructing power feeding to a vehicle when the adapter is connected to a plug of a charging cable used for external charging with electric power from an external power supply. When the plug and the adapter are not completely fitted to each other, the leakage generation circuit electrically connects the power transmission path to a ground to cause a leakage state. In the vehicle, in response to a signal instructing power feeding, a power conversion device is driven to supply electric power from the vehicle to an external electrical device through the charging cable. Then, when the leakage state is caused by the leakage generation circuit, power feeding to the electrical device is stopped.

17 Claims, 16 Drawing Sheets

(51) Int. Cl.

| | |
|---|---|
| *B60L 3/00* | (2006.01) |
| *B60L 3/04* | (2006.01) |
| *B60L 7/14* | (2006.01) |
| *B60L 11/00* | (2006.01) |
| *B60L 11/14* | (2006.01) |
| *H01R 31/06* | (2006.01) |
| *H01R 13/703* | (2006.01) |

(52) U.S. Cl.
 CPC ............ *H01R 13/703* (2013.01); *H01R 31/065* (2013.01); *Y02E 60/721* (2013.01); *Y02T 10/70* (2013.01); *Y02T 10/7005* (2013.01); *Y02T 10/7022* (2013.01); *Y02T 10/7077* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 2009/0179655 A1* | 7/2009 | Trenchs Magana et al. | 324/537 |
| 2011/0121779 A1 | 5/2011 | Ichikawa et al. | |
| 2011/0270476 A1* | 11/2011 | Doppler et al. | 701/22 |
| 2011/0300753 A1 | 12/2011 | Ichikawa et al. | |

FOREIGN PATENT DOCUMENTS

| | | |
|---|---|---|
| JP | A-2010-165619 | 7/2010 |
| WO | 2010097922 A1 | 9/2010 |

* cited by examiner

ADAPTER AND VEHICLE FOR PERFORMING POWER FEEDING USING ADAPTER

TECHNICAL FIELD

The present invention relates to an adapter, and a vehicle for performing power feeding using the adapter, and more specifically to a technique for supplying electric power generated by a vehicle to an external electrical device.

BACKGROUND ART

In recent years, a vehicle equipped with a power storage device (for example, a secondary battery, a capacitor and the like) and running with driving force generated from the electric power stored in the power storage device has received attention as an environmentally-friendly vehicle. Such a vehicle includes, for example, an electric vehicle, a hybrid vehicle, a fuel-cell vehicle, and the like. There is a proposed technique for charging the power storage device mounted in the above-described vehicle by a commercial power supply having high power generation efficiency.

As a hybrid vehicle, there is also a known vehicle equipped with a power storage device that can be charged by a power supply external to the vehicle (hereinafter simply referred to as an "external power supply") as in the case of the electric vehicle (which will be hereinafter simply referred to as "external charging"). For example, the so-called "plug-in hybrid vehicle" is known which is provided with a power storage device that can be charged by a household power supply through the charging cable connecting between the receptacle provided in the house and the charging port provided in the vehicle. According to this, an improvement in the fuel consumption efficiency of the hybrid vehicle can be expected.

As for such an externally chargeable vehicle, there has been developed a concept of supplying electric power from a vehicle, which is regarded as a power supply source, to a commonly-used electrical device external to the vehicle, as seen in the smart grid and the like. Furthermore, a vehicle may be used as a power supply for using an electrical device when working outdoors, in camping or the like.

Japanese Patent Laying-Open No. 2010-035277 (PTL 1) discloses a charging/discharging system capable of charging a battery mounted on a vehicle using a charging cable and supplying electric power from the vehicle to an electric load external to the vehicle by using a power cable exclusively for power feeding, which is different from the charging cable, and to which a power supply plug of the electric load external to the vehicle can be connected.

CITATION LIST

Patent Document

PTD 1: Japanese Patent Laying-Open No. 2010-035277
PTD 2: Japanese Patent Laying-Open No. 2010-165619

SUMMARY OF INVENTION

Technical Problem

In the system disclosed in Japanese Patent Laying-Open No. 2010-035277 (PTL 1), however, a charging cable and a power feeding cable should be separately provided, which requires replacement of the power cable used between during charging and during power feeding. Consequently, two types of cables should be prepared, thereby increasing the cost. Also, the user's operation may become complicated due to replacement of the cables. For this reason, it is preferable that the charging cable can be used also for power feeding since both of charging and power feeding can be carried out by one type of cable.

In this case, if the plug of the cable is removed during the power feeding operation, the terminal portion of the plug may be kept applied with a power-feeding voltage, which may cause a failure or deterioration of devices or may exert influences upon surrounding devices. Accordingly, it is desirable to immediately stop the power feeding operation when the plug of the cable is pulled out.

The present invention has been made to solve the above-described problems. An object of the present invention is to provide, for an externally chargeable vehicle, a conversion adaptor that allows electric power to be supplied to an external electrical device from the vehicle using a charging power cable and also allows the power feeding operation to be stopped appropriately when the charging power cable is removed.

Solution to Problem

An adapter according to the present invention serves as an adapter used for supplying electric power from a power source including a power storage device mounted in a vehicle to an electrical device external to the vehicle through a charging cable. The vehicle is capable of performing external charging that allows the power storage device to be charged using electric power supplied from an external power supply through the charging cable. In response to a signal instructing power feeding that is generated by connection between the adapter and the charging cable, the vehicle performs power feeding to the electrical device. The adapter includes a first connection unit capable of connecting a power supply plug connected to the external power supply in the charging cable during external charging, a second connection unit electrically connected to the first connection unit and capable of connecting a power supply plug of the electrical device, and a leakage generation circuit causing a leakage state in a power transmission path connecting the first connection unit and the second connection unit when the adapter and the charging cable are incompletely fitted to each other.

Preferably, the leakage generation circuit is configured to cause the leakage state by electrical connection between at least one power transmission path of the power transmission paths and a ground when the adapter and the charging cable are incompletely fitted to each other.

Preferably, the leakage generation circuit includes a switching unit configured to switch between connection and disconnection between the power transmission path and the ground. The switching unit causes all of the power transmission paths to be disconnected from the ground when the adapter and the charging cable are completely fitted to each other, and causes at least one power transmission path to be electrically connected to the ground when the adapter and the charging cable are incompletely fitted to each other.

Preferably, the switching unit is operated by an operation member provided in a power supply plug of the charging cable when the adapter and the charging cable are connected to each other.

Preferably, the adapter further includes a locking unit configured to engage with a power supply plug of the charging cable when the adapter and the charging cable are completely fitted to each other, and an operation unit configured to operate the locking unit for releasing the engagement between the power supply plug and the adapter. The switching unit causes at least one power transmission path to be electrically connected to the ground in accordance with an operation of the operation unit by a user.

Preferably, the charging cable includes a leakage detection circuit for detecting the leakage state. The charging cable stops outputting the signal instructing power feeding to the vehicle when the leakage state is detected.

Preferably, the charging cable further includes a cut-off circuit for cutting off power feeding to the adapter when the leakage state is detected.

Preferably, the vehicle includes a leakage detection circuit for detecting the leakage state. The vehicle stops power feeding to the charging cable when the leakage state is detected.

A vehicle according to the present invention serves as a vehicle that is capable of performing external charging that allows a power storage device mounted therein to be charged using electric power supplied from an external power supply through a charging cable and is capable of feeding electric power to an external electrical device by connection of an adapter to the charging cable. The vehicle includes a power source including the power storage device; an inlet for connecting the charging cable during external charging; a power conversion device for converting electric power from the power source to supply the converted electric power to the inlet; and a control device for controlling the power conversion device. The adapter includes a first connection unit capable of connecting a power supply plug connected to the external power supply in the charging cable during external charging, a second connection unit electrically connected to the first connection unit and capable of connecting a power supply plug of the electrical device, and a leakage generation circuit causing a leakage state to occur in a power transmission path connecting the first connection unit and the second connection unit when the adapter and the charging cable are incompletely fitted to each other. In response to reception of a signal instructing power feeding that is generated by connection between the adapter and the charging cable, the control device drives the power conversion device to supply the electric power from the power source to the electrical device. Then, the control device stops power feeding to the electrical device when the leakage state is detected.

Advantageous Effects of Invention

By using a conversion adaptor according to the present invention, in an externally chargeable vehicle, it becomes possible to supply electric power from the vehicle to an external electrical device through a charging power cable and also possible to appropriately stop a power feeding operation when the adapter is removed from the charging power cable during power feeding from the vehicle.

DESCRIPTION OF EMBODIMENTS

Figure 1:
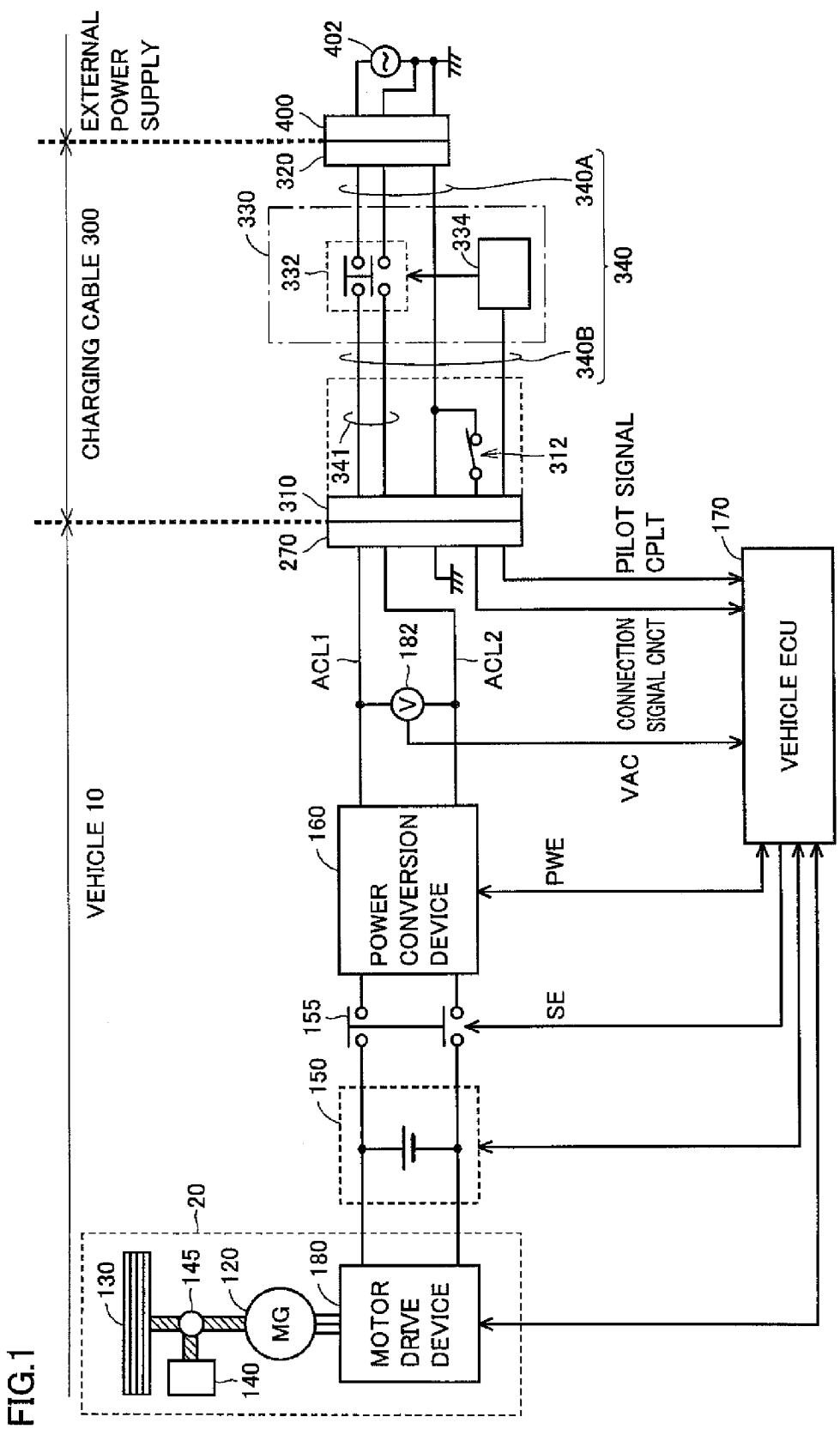
FIG. 1 is an entire block diagram of a charging system in a vehicle according to the present embodiment.

The embodiments of the present invention will be hereinafter described in detail with reference to the accompanying drawings, in which the same or corresponding components are designated by the same reference characters, and description thereof will not be repeated.

[Description of Charging System]

FIG. 1 is a schematic diagram of a charging system in a vehicle 10 according to the first embodiment. Explained with reference to FIG. 1 will be the case where the electric power from an external power supply 402 is used to charge a power storage device 150 mounted in vehicle 10.

It is to be noted that the configuration of vehicle 10 is not particularly limited as long as it can run with electric power from the power storage device that can be charged by an external power supply. Vehicle 10 may be, for example, a hybrid vehicle, an electric vehicle, a fuel-cell vehicle, and the like. Also, the configuration of vehicle 10 is applicable to any vehicle that, for example, runs with an internal combustion engine as long as it is provided with a chargeable power storage device.

Referring to FIG. 1, vehicle 10 includes an inlet 270, a power conversion device 160, a relay 155, a power storage device 150, a drive unit 20, a vehicle ECU (Electronic Control Unit) 170, and a voltage sensor 182. Drive unit 20 includes a motor drive device 180, a motor generator (which will be hereinafter also referred to as an "MG") 120, a driving wheel 130, an engine 140, and a power split device 145.

A connector 310 provided in a charging cable 300 is connected to inlet 270.

Power conversion device 160 is connected to inlet 270 through power lines ACL1 and ACL2. Furthermore, power conversion device 160 is connected to power storage device 150 through relay 155. Based on a control signal PWE from vehicle ECU 170, power conversion device 160 converts alternating-current (AC) power supplied from a power supply 402 external to the vehicle into a direct-current (DC) power with which power storage device 150 can be charged. Then, power conversion device 160 supplies the converted DC power to power storage device 150.

Power storage device 150 is a chargeable and dischargeable electric power storage component. Power storage device 150 is configured to include, for example, a secondary battery such as a lithium-ion battery, a nickel-metal hydride battery or a lead acid battery, or a power storage element such as an electric double layer capacitor.

Power storage device 150 stores the DC power supplied from power conversion device 160. Power storage device 150 is connected to motor drive device 180 driving MG 120, and supplies the DC power used for generating a driving force used for vehicle running. Furthermore, power storage device 150 stores the electric power generated by MG 120.

Although not shown, power storage device 150 further includes a voltage sensor for detecting a voltage of power storage device 150 and a current sensor for detecting a current that is input to and output from power storage device 150. Power storage device 150 outputs the detection values of the voltage and the current detected by these sensors to vehicle ECU 170.

Motor drive device 180 is connected to power storage device 150 and MG 120. Motor drive device 180 is controlled by vehicle ECU 170, to convert the electric power supplied from power storage device 150 into electric power for driving MG 120. Motor drive device 180 is configured, for example, to include a three-phase inverter.

MG 120 is connected to motor drive device 180 and also connected through power split device 145 to driving wheel 130. MG 120 receives electric power supplied from motor drive device 180 to generate a driving force used for causing vehicle 10 to run. While MG 120 receives rotating force from driving wheel 130 to generate AC power and generates regenerative braking force by a regenerative torque command from vehicle ECU 170. MG 120 is configured to include, for example, a three-phase AC motor generator including a rotor having a permanent magnet embedded therein and a stator having a Y-connected three-phase coil.

MG 120 is connected also to engine 140 through power split device 145. Vehicle ECU 170 controls the driving forces of the engine and MG 120 to be set at an optimal ratio. Furthermore, when being driven by engine 140, MG 120 can also operate as a power generator. The electric power generated by MG 120 is stored in power storage device 150. Alternatively, the electric power generated by MG 120 may be supplied to electrical devices external to the vehicle through inlet 270 as described below.

Voltage sensor 182 is connected between power lines ACL1 and ACL2, and detects a voltage of the electric power supplied from external power supply 402. Then, voltage sensor 182 outputs a detection value VAC of the voltage to vehicle ECU 170.

Relay 155 is interposed in the path connecting power conversion device 160 and power storage device 150. Relay 155 is controlled by a control signal SE from vehicle ECU 170 to switch between supply and cut-off of the electric power between power conversion device 160 and power storage device 150. In addition, although the present embodiment shows the configuration in which relay 155 is separately provided, relay 155 may also be included in power storage device 150 or power conversion device 160.

Although not shown in FIG. 1, vehicle ECU 170 includes a CPU (Central Processing Unit), a storage device and an input/output buffer. Vehicle ECU 170 inputs the signal from each sensor and the like and outputs the control command to each device, and also controls vehicle 10 and each device. The control of these devices and the like is not limited to the process by means of software, but the process can be implemented by constructing dedicated hardware (an electronic circuit).

Vehicle ECU 170 receives a connection signal CNCT and a pilot signal CPLT from charging cable 300 through inlet 270. Furthermore, vehicle ECU 170 receives a voltage detection value VAC of the received electric power from voltage sensor 182.

Vehicle ECU 170 receives inputs of detection values about a current, a voltage and a temperature from the sensor (not shown) installed within power storage device 150, to calculate the state amount showing the state of charge of power storage device 150 (which will be hereinafter also referred to as an "SOC (State of Charge)").

Then, based on these pieces of information, vehicle ECU 170 controls power conversion device 160, relay 155 and the like for charging power storage device 150.

Charging cable 300 has a connector 310 provided at its end on the vehicle side; a plug 320 provided at its end on the external power supply side; a charging circuit interrupt device (which will be hereinafter also referred to as a "CCID") 330; and a power line unit 340 that connects between the devices and inputs/outputs electric power and a control signal.

Power line unit 340 includes a power line unit 340A connecting between plug 320 and CCID 330, and a power line unit 340B connecting between connector 310 and CCID 330. Furthermore, power line unit 340 includes a power line 341 for transmitting electric power from external power supply 402.

Charging cable 300 is connected to a receptacle 400 of external power supply 402 (for example, a commercial power supply) through plug 320 of charging cable 300. Furthermore, inlet 270 provided in the body of vehicle 10 and connector 310 of charging cable 300 are connected to each other for transmitting the electric power to vehicle 10 from power supply 402 external to the vehicle. Charging cable 300 is detachable from and attachable to external power supply 402 and vehicle 10.

A connection detecting circuit 312 detecting connection of connector 310 is provided within connector 310 and detects the state of connection between inlet 270 and connector 310. Connection detecting circuit 312 outputs a connection signal CNCT showing the connection state to vehicle ECU 170 of vehicle 10 through inlet 270.

Connection detecting circuit 312 may be configured as a limit switch as shown in FIG. 1, so as to cause the potential of connection signal CNCT to be a ground potential (0V) when connector 310 is connected to inlet 270. Alternatively, connection detecting circuit 312 may be configured as a resistor (not shown) having a prescribed resistance value, so as to cause the potential of connection signal CNCT to be decreased to a prescribed potential at the time of connection. In each case, vehicle ECU 170 detects the potential of connection signal CNCT to thereby detect that connector 310 has been connected to inlet 270.

CCID 330 includes a CCID relay 332 and a control pilot circuit 334. CCID relay 332 is interposed in a power line 341 within charging cable 300. CCID relay 332 is controlled by control pilot circuit 334. When CCID relay 332 is opened, the electric path is cut off within charging cable 300. On the other hand, when CCID relay 332 is closed, the electric power is supplied from external power supply 402 to vehicle 10.

Control pilot circuit 334 outputs pilot signal CPLT to vehicle ECU 170 through connector 310 and inlet 270. This pilot signal CPLT serves as a signal from control pilot circuit 334 for notifying vehicle ECU 170 about the rated current of charging cable 300. Furthermore, pilot signal CPLT also serves as a signal used for remote-controlling CCID relay 332 by vehicle ECU 170 based on the potential of pilot signal CPLT controlled by vehicle ECU 170. Also, control pilot circuit 334 controls CCID relay 332 based on the change in the potential of pilot signal CPLT.

The above-described pilot signal CPLT and connection signal CNCT, and the configuration such as a shape and a terminal arrangement of inlet 270, connector 310 and the like are standardized, for example, by SAE (Society of Automotive Engineers) in the U.S., Japan Electric Vehicle Association, and the like.

Figure 2:
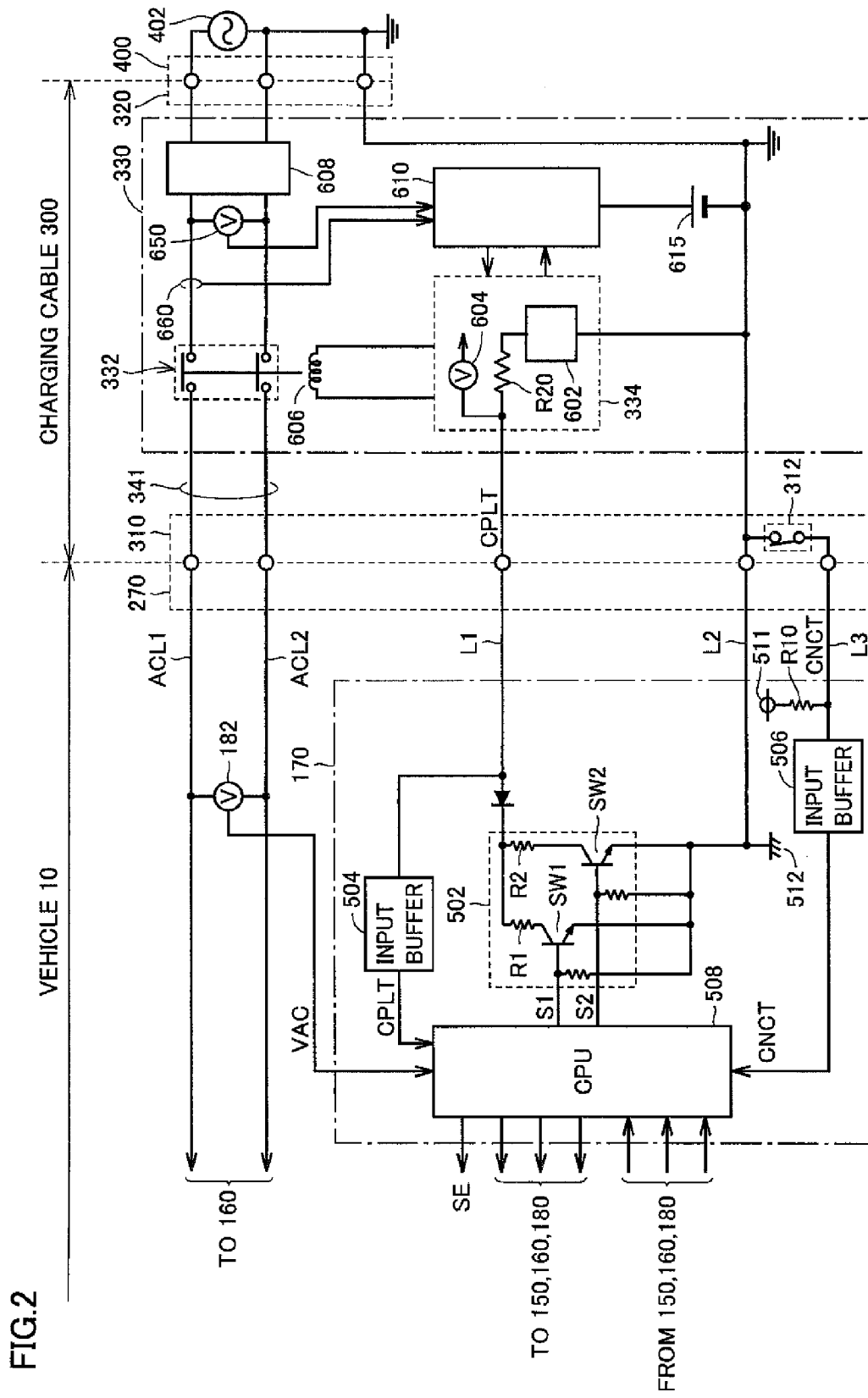
FIG. 2 is an example of a detailed diagram of a charging mechanism in FIG. 1.

FIG. 2 is a diagram for illustrating the charging circuit shown in FIG. 1 in greater detail. In FIG. 2, description of the components designated by the same reference characters as those in FIG. 1 will not be repeated.

Referring to FIG. 2, in addition to CCID relay 332 and control pilot circuit 334, CCID 330 further includes an electromagnetic coil 606, a leakage detector 608, a CCID control unit 610, a battery 615, a voltage sensor 650, and a current sensor 660. Furthermore, control pilot circuit 334 includes an oscillation device 602, a resistance R20 and a voltage sensor 604.

Although not shown, CCID control unit 610 includes a CPU, a storage device and an input/output buffer, and inputs/outputs the signals of each sensor and control pilot circuit 334 while controlling the charging operation of charging cable 300. CCID control unit 610 is supplied with a power supply from battery 615 incorporated in CCID 330.

When the potential of pilot signal CPLT detected by voltage sensor 604 is a prescribed potential (for example, 12V), oscillation device 602 outputs a non-oscillating signal. When the potential of pilot signal CPLT is decreased from the prescribed potential as mentioned above (for example, 9V), oscillation device 602 is controlled by CCID control unit 610, to output the signal oscillating at a prescribed frequency (for example, 1 kHz) and in a prescribed duty cycle.

In addition, the potential of pilot signal CPLT is controlled by vehicle ECU 170, as will be described later with reference to FIG. 3. Furthermore, the duty cycle is set based on the rated current that can be supplied from external power supply 402 through charging cable 300 to vehicle 10.

When the potential of pilot signal CPLT is decreased from the prescribed potential as described above, pilot signal CPLT oscillates in a prescribed cycle. In this case, based on the rated current that can be supplied to vehicle 10 through charging cable 300 from external power supply 402, the pulse width of pilot signal CPLT is set. In other words, by the duty shown by the ratio of the pulse width to this oscillation cycle, vehicle ECU 170 of vehicle 10 is notified of the rated current by pilot signal CPLT from control pilot circuit 334.

Since the rated current is set for each charging cable, the rated current differs according to the types of charging cable 300. Therefore, the duty of pilot signal CPLT also differs according to the types of charging cable 300.

Based on the duty of pilot signal CPLT received through a control pilot line L1, vehicle ECU 170 can detect the rated current that can be supplied to vehicle 10 through charging cable 300.

When the potential of pilot signal CPLT is further decreased by vehicle ECU 170 (for example, 6V), control pilot circuit 334 supplies a current to electromagnetic coil 606. When receiving a current from control pilot circuit 334, electromagnetic coil 606 generates an electromagnetic force and closes the contact of CCID relay 332 to bring about a conducting state.

Leakage detector 608 is provided in the middle of power line 341 of charging cable 300 within CCID 330, and detects whether leakage occurs or not. Specifically, leakage detector 608 detects the equilibrium state of the current flowing through a pair of power lines 341 in the directions opposite to each other. Then, when the equilibrium state is disturbed, leakage detector 608 detects occurrence of leakage. Although not particularly shown, when leakage detector 608 detects leakage, power feeding to electromagnetic coil 606 is cut off and the contact of CCID relay 332 is opened to bring about a non-conducting state.

When plug 320 of charging cable 300 is inserted into receptacle 400, voltage sensor 650 detects the power supply voltage transmitted from external power supply 402, and notifies CCID control unit 610 of the detection value. Furthermore, current sensor 660 detects the charging current flowing through power line 341, and notifies CCID control unit 610 of the detection value.

Connection detecting circuit 312 included within connector 310 is, for example, a limit switch as described above, in which case the contact is closed in the state where connector 310 is connected to inlet 270 while the contact is opened in the state where connector 310 is disconnected from inlet 270.

In the state where connector 310 is disconnected from inlet 270, a voltage signal determined by the voltage on a power supply node 511 and a pull-up resistance R10 included in vehicle ECU 170 is generated as connection signal CNCT on a connection signal line L3. Furthermore, in the state where connector 310 is connected to inlet 270, connection signal line L3 is short-circuited to a ground line L2, with the result that the potential on connection signal line L3 becomes a ground potential (0V).

It is to be noted that connection detecting circuit 312 can also be a resistor (not shown). In this case, in the state where connector 310 is connected to inlet 270, a voltage signal determined by the voltage on power supply node 511 and pull-up resistance R10 and also by this resistor is generated on connection signal line L3.

Even if connection detecting circuit 312 is a limit switch or a resistor as described above, the potential generated on connection signal line L3 (that is, the potential of connection signal CNCT) varies between the time when connector 310 is connected to inlet 270 and the time when connector 310 is disconnected from inlet 270. Therefore, vehicle ECU 170 can detect the connection state of connector 310 by detecting the potential of connection signal line L3.

In vehicle 10, in addition to power supply node 511 and pull-up resistance R10 described above, vehicle ECU 170 further includes a resistance circuit 502, input buffers 504, 506, and a CPU 508.

Resistance circuit 502 includes pull-down resistances R1, R2, and switches SW1 and SW2. Pull-down resistance R1 and switch SW1 are connected in series between a vehicle ground 512 and control pilot line L1 through which pilot signal CPLT is communicated. Pull-down resistance R2 and switch SW2 are also connected in series between control pilot line L1 and vehicle ground 512. Switches SW1 and SW2 are controlled in accordance with control signals S1 and S2, respectively, from CPU 508 to be brought into a conducting state or a non-conducting state.

This resistance circuit 502 serves to control the potential of pilot signal CPLT from the vehicle 10 side.

Input buffer 504 receives pilot signal CPLT on control pilot line L1, and outputs the received pilot signal CPLT to CPU 508. Input buffer 506 receives connection signal CNCT through connection signal line L3 connected to connection detecting circuit 312 of connector 310, and outputs the received connection signal CNCT to CPU 508. As described above, vehicle ECU 170 applies a voltage to connection signal line L3, and the potential of connection signal CNCT is changed by connection of connector 310 to inlet 270. CPU 508 detects the potential of this connection signal CNCT, thereby detecting the connection state of connector 310.

CPU 508 receives pilot signal CPLT and connection signal CNCT from input buffers 504 and 506, respectively.

CPU 508 detects the potential of connection signal CNCT, and detects the connection state of connector 310.

Furthermore, CPU 508 detects the oscillation state and the duty cycle of pilot signal CPLT, thereby detecting the rated current of charging cable 300 as described above.

Then, based on the potential of connection signal CNCT and the oscillation state of pilot signal CPLT, CPU 508 controls control signals S1 and S2 of switches SW1 and SW2, respectively, thereby controlling the potential of pilot signal CPLT. Consequently, CPU 508 can remotely operate CCID relay 332. Then, electric power is transmitted from external power supply 402 to vehicle 10 through charging cable 300.

Referring to FIGS. 1 and 2, when the contact of CCID relay 332 is closed, the AC power from external power supply 402 is supplied to power conversion device 160, and then, the preparation for charging power storage device 150 from external power supply 402 is completed. CPU 508 outputs a control signal PWE to power conversion device 160, thereby converting the AC power from external power supply 402 into a DC power that can be supplied to power storage device 150. Then, CPU 508 outputs control signal SE and closes the contact of relay 155, thereby charging power storage device 150.

Figure 3:
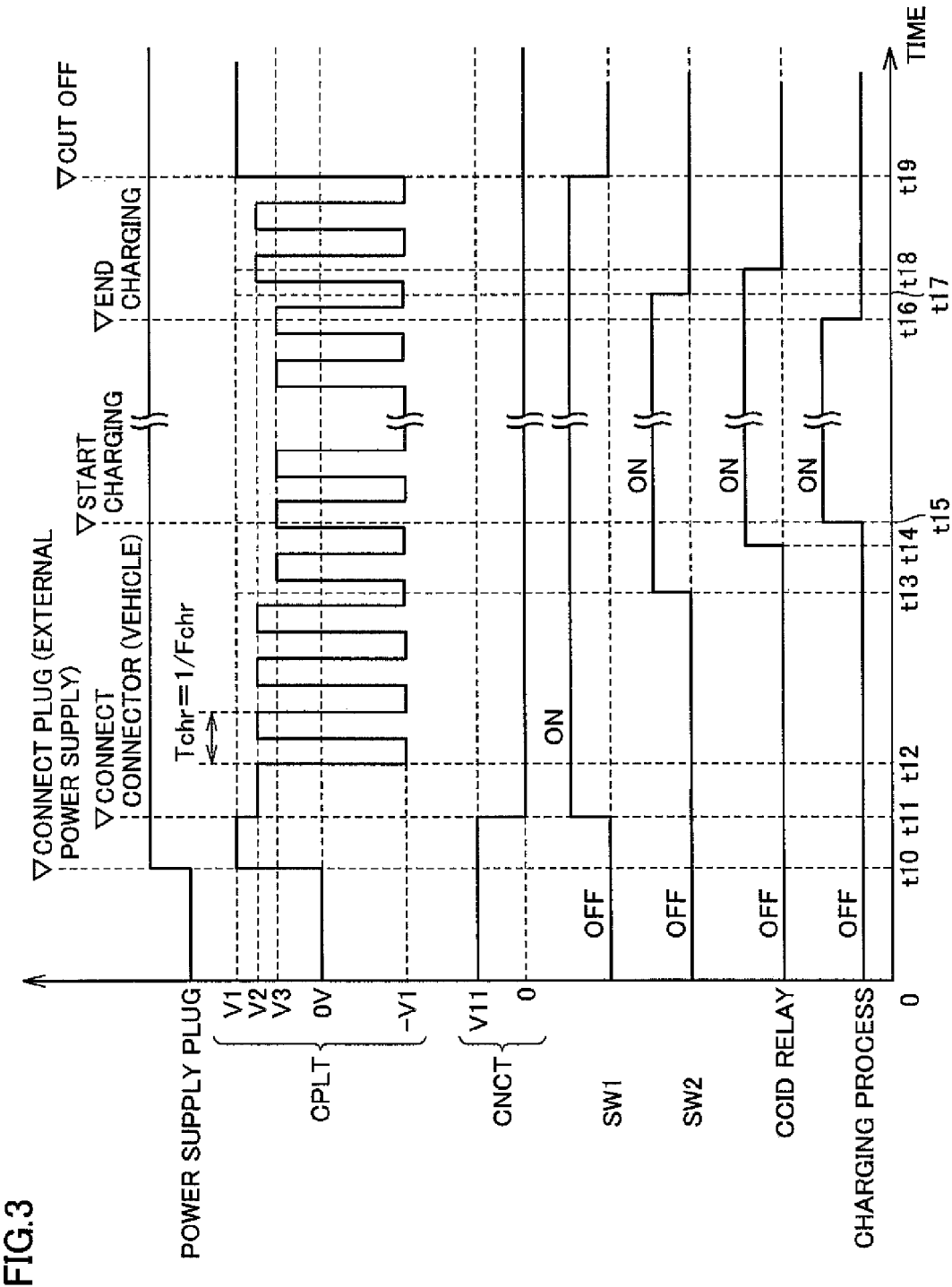
FIG. 3 is a time chart for illustrating charging control in the case where external charging is performed.

FIG. 3 is a time chart for illustrating charging control in the charging system in FIG. 2. In FIG. 3, the horizontal axis shows time while the vertical axis shows the state of connection of plug 320 to external power supply 402, the potential of pilot signal CPLT, the potential of connection signal CNCT, the states of switches SW1 and SW2, the state of CCID relay 332, and the execution state of the charging process.

Referring to FIGS. 2 and 3, charging cable 300 is not connected to vehicle 10 and external power supply 402 until time t10. In this state, switches SW1, SW2 and CCID relay 332 are in an OFF state while the potential of pilot signal CPLT is 0V. Furthermore, the potential of connection signal CNCT is V11 (>0V).

At time t10, when plug 320 of charging cable 300 is connected to receptacle 400 of external power supply 402, control pilot circuit 334 generates pilot signal CPLT.

It is to be noted that connector 310 of charging cable 300 is not connected to inlet 270 at this time t10. Also, the potential of pilot signal CPLT is V1 (for example, 12V) while pilot signal CPLT is in a non-oscillation state.

At time t11, when connector 310 is connected to inlet 270, the potential of connection signal CNCT is decreased by connection detecting circuit 312.

Then, CPU 508 detects that the potential of connection signal CNCT has been decreased, thereby detecting connection between connector 310 and inlet 270. In response to this, control signal S1 is activated by CPU 508, and switch SW1 is turned on. Then, the potential of pilot signal CPLT is decreased to V2 (for example, 9V) by pull-down resistance R1 of resistance circuit 502.

At time t12, CCID control unit 610 detects that the potential of pilot signal CPLT has been decreased to V2. In response to this, CCID control unit 610 causes pilot signal CPLT to oscillate in an oscillation cycle Tchr (=1/Fchr). It is to be noted that Fchr shows an oscillation frequency.

When detecting that pilot signal CPLT has been oscillated, CPU 508 detects the rated current of charging cable 300 by the duty of pilot signal CPLT as described above.

Then, in order to start a charging operation, CPU 508 activates control signal S2 to turn on switch SW2. In response to this, the potential of pilot signal CPLT is decreased to V3 (for example, 6V) by pull-down resistance R2 (time t13 in FIG. 3).

When CCID control unit 610 detects that the potential of this pilot signal CPLT has been decreased to V3, the contact of CCID relay 332 is closed at time t14, to transmit the electric power from external power supply 402 to vehicle 10 through charging cable 300.

Then, when an AC voltage VAC is detected in vehicle 10, the contact of relay 155 (FIG. 1) is closed by CPU 508 and power conversion device 160 (FIG. 1) is controlled, thereby starting to charge power storage device 150 (FIG. 1) (time t15 in FIG. 3).

When charging of power storage device 150 proceeds and it is determined that power storage device 150 is fully charged, CPU 508 ends the charging process (time t16 in FIG. 3). Then, CPU 508 deactivates control signal S2, to bring switch SW2 into a non-conducting state (time t17 in FIG. 3). Consequently, the potential of pilot signal CPLT becomes V2, and accordingly, the charging process is stopped while CCID relay 332 is brought into a non-conducting state (time t18), thereby ending the charging operation. Then, CPU 508 deactivates control signal S1 to bring switch SW1 into a non-conducting state, thereby shutting down the system.

In such an externally chargeable vehicle as described above, it is possible to store the electric power from the power supply external to the vehicle such as a commercial power supply in the power storage device of the vehicle.

On the other hand, as in the so-called smart grid, it has been studied that electric power stored in a vehicle, which is regarded as a power supply source, is supplied to electrical devices and power networks external to the vehicle. Furthermore, a vehicle may be used as a power supply for using an electrical device when working outdoors, in camping or the like.

Figure 4:
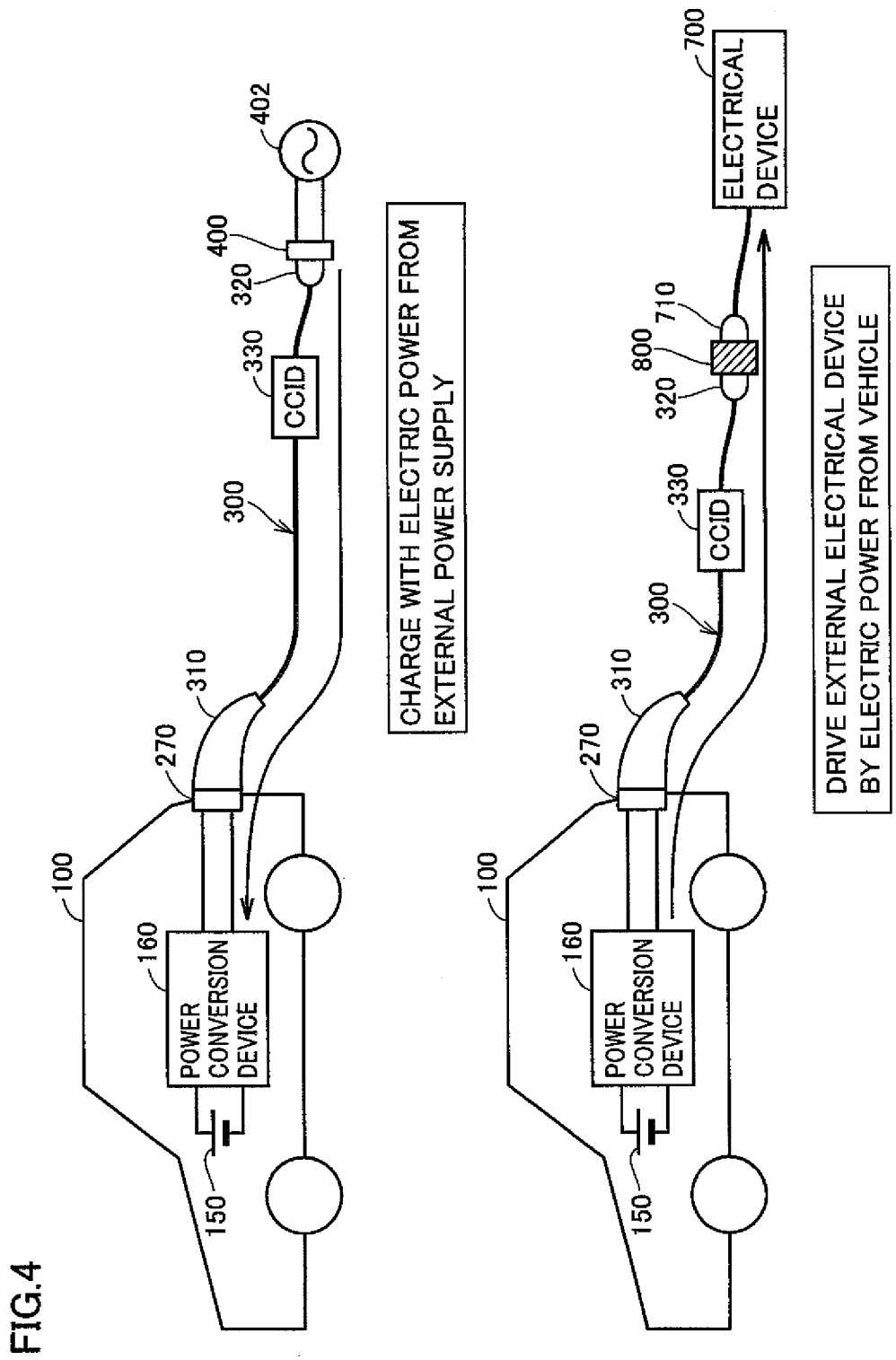
FIG. 4 is a schematic diagram for illustrating the outline of the present embodiment.

In this case, as shown in FIG. 4, it is suitable if electric power can be supplied from the vehicle by utilizing charging cable 300 used when performing external charging, since it is not necessary to separately provide an outlet for connecting electrical devices, which not only can obviate or eliminate the need to modify the vehicle, but also can eliminate the need to prepare a power cable dedicated to power feeding.

Thus, in the present embodiment, a conversion adapter 800 is provided as shown in the lower section in FIG. 4. To this conversion adapter 800, plug 320 of charging cable 300 used during external charging and a power supply plug 710 of an electrical device 700 external to the vehicle can be connected. Also this conversion adapter 800 allows the electric power from vehicle 10 to be supplied to electrical device 700 external to the vehicle through charging cable 300 (which will be hereinafter referred to as "power feeding to outside").

By connecting this adapter 800, as described below, power conversion device 160 of vehicle 10 converts the DC power stored in power storage device 150 serving as a power generation device into AC power that can be used in electrical device 700 (for example, AC 100V, 200V and the like), and the converted power is supplied to electrical device 700.

In the case of a hybrid vehicle provided with engine 140 as shown in FIG. 1, engine 140 and MG 120 are included as a power generation device of vehicle 10, in addition to the above-described power storage device 150. In this case, the electric power (AC power) generated by engine 140 driving MG 120 is converted by motor drive device 180 and power conversion device 160 into AC power that can be used in electrical device 700. Then, the converted power can be supplied to electrical device 700. Although not shown in FIG. 1, it is also possible to use electric power from an auxiliary battery for supplying a power supply voltage to auxiliary machinery included in vehicle 10. Alternatively, if vehicle 10 is a fuel-cell vehicle, it is also possible to supply the electric power generated by a fuel cell.

Therefore, in addition to the above-described function of converting the electric power from external power supply 402 into charge power for power storage device 150, power conversion device 160 used in the present embodiment should have a function of converting the electric power stored in vehicle 10 and/or the electric power generated in vehicle 10 into driving electric power for external electrical device 700. In addition, as for power conversion device 160, one power conversion device capable of bidirectionally converting electric power between external charging and power feeding to outside may be provided, or a power conversion device exclusively for external charging and a power conversion device exclusively for power feeding to outside may be separately provided.

In this case, when adapter 800 is removed from plug 320 of charging cable 300 in the hot-line state during power feeding to outside using such adapter 800, an arc current may be generated between terminals, or a voltage may be kept applied to the terminal portion exposed on the plug 320 side until completion of the operation of ending the power-feeding operation on the vehicle side. This may cause a short circuit or a ground fault between the terminal portions, thereby causing an excessive current to flow therethrough, which may lead to deterioration or failures of devices or may exert an influence upon surroundings.

Accordingly, adapter 800 proposed in the present embodiment is provided with a leakage generation circuit that artificially causes a leakage state by electrical connection between the power transmission path used for power feeding and the ground when adapter 800 is removed from plug 320. Charging cable 300 and/or vehicle 10 generally include(s) a leakage detection circuit and a power cut-off circuit for preventing an accident and a failure. Therefore, power feeding from vehicle 10 can be immediately stopped by artificially causing the leakage state as described above.

First Embodiment

Figure 5:
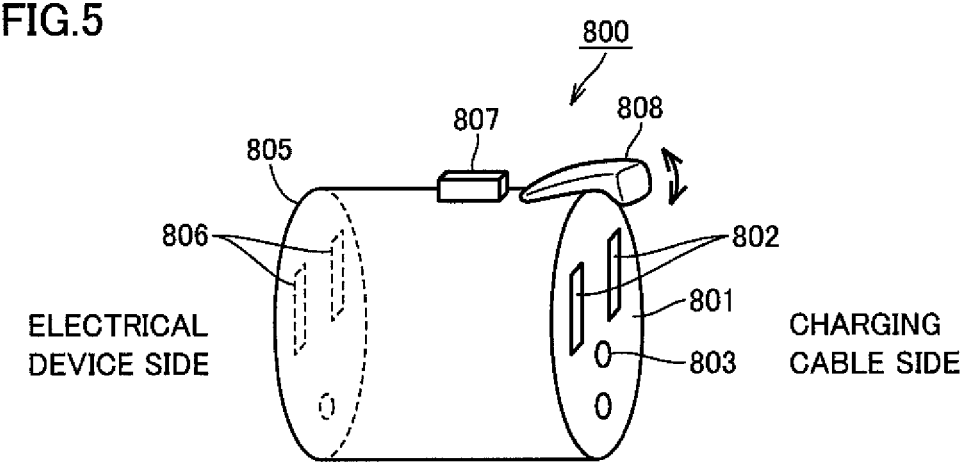
FIG. 5 is a diagram showing the outline of an adapter according to the present embodiment.
Figure 6:
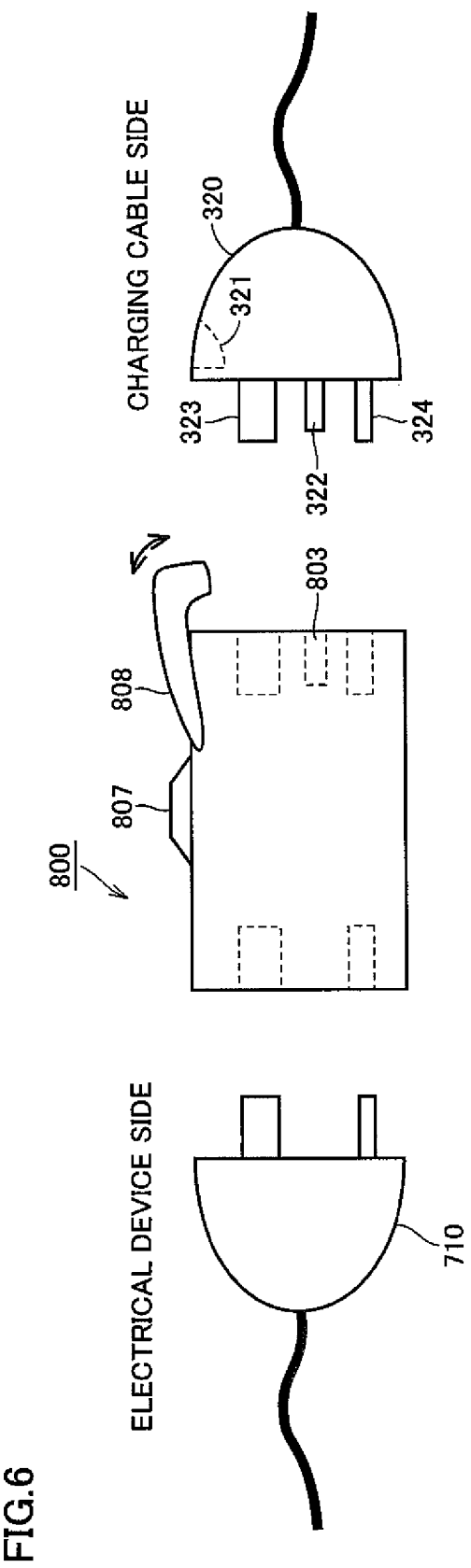
FIG. 6 is a diagram for illustrating the adapter in FIG. 5.

FIGS. 5 and 6 each are a schematic diagram showing an example of adapter 800 used during power feeding to outside, as described with reference to FIG. 4.

Referring to FIGS. 5 and 6, adapter 800 includes a connection unit 801 for connecting plug 320 of charging cable 300, a connection unit 805 for connecting power supply plug 710 of external electrical device 700, an operation unit 807, and a locking unit 808.

Connection unit 801 on the charging cable 300 side is provided with a terminal unit 802 to which the terminal of plug 320 is connected. Connection unit 801 is also provided with an insertion hole 803 through which an operation member 322 formed in a protruding shape as shown in FIG. 6 and provided in plug 320 can be inserted when adapter 800 and plug 320 are connected to each other. The function of operation member 322 will be described later.

When adapter 800 and plug 320 of charging cable 300 are connected to each other, locking unit 808 engages with a concave portion 321 provided in plug 320. Thus, locking unit 808 and concave portion 321 engage with each other, so that easy disconnection of adapter 800 from plug 320 can be prevented.

Locking unit 808, which cooperatively operates with operation unit 807 (for example, a push button) included in adapter 800, is operated in the direction indicated by an arrow in FIG. 5 or 6 when operation unit 807 is operated. This allows disengagement between locking unit 808 and concave portion 321.

In addition, although these locking unit 808 and operation unit 807 are not an indispensable configuration in the present invention, such a configuration is suitable since it can prevent adapter 800 from being unintentionally pulled out from plug 320.

On the other hand, connection unit 805 on the electrical device 700 side is provided with a terminal unit 806 corresponding to the terminal shape of power supply plug 710 of electrical device 700. Terminal unit 806 has a shape that is, for example, adapted to a voltage (100V, 200V and the like) to be used and the standards specified in the country in which this terminal unit is to be used.

FIG. 5 shows an example in which connection units 801 and 805 are housed in the same housing as an integrated structure, which may be however also configured such that the connector on the charging cable side and the connector on the electrical device side are separated from each other and coupled through a cable serving as a power transmission medium, though not shown in the figure.

Then explained will be a circuit configuration used when adapter 800 is used and charging cable 300 is used to supply electric power from vehicle 10 to electrical device 700.

Figure 7:
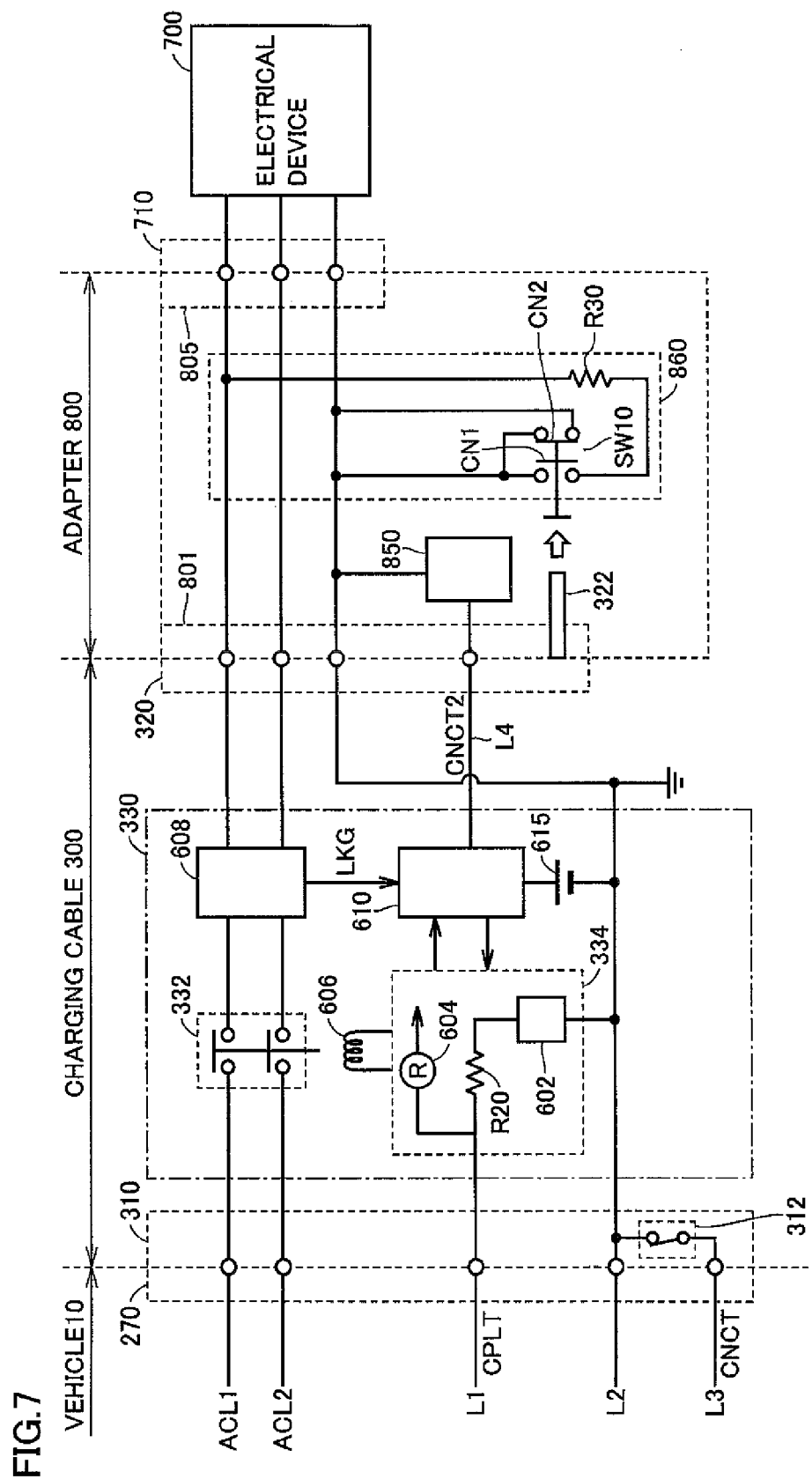
FIG. 7 is a detailed diagram of a circuit in the case where power feeding is performed through a charging cable by using the adapter in the first embodiment.

FIG. 7 is a detailed diagram of a circuit in the case where adapter 800 according to the first embodiment is used for power feeding. The configuration of vehicle 10 is the same as that in FIG. 2, and components in vehicle 10 and charging cable 300 are partially not shown in FIG. 7. The same components as those in FIG. 2 will not be explained in FIG. 7.

Referring to FIG. 7, adapter 800 includes a signal generation unit 850 and a leakage generation circuit 860 in addition to connection units 801 and 805.

When adapter 800 is connected to plug 320 of charging cable 300, signal generation unit 850 is electrically connected to a signal line L4 within charging cable 300 through another terminal unit that is not shown in FIG. 6. When adapter 800 is connected to plug 320, signal generation unit 850 supplies a signal CNCT2 to CCID control unit 610 through signal line L4 that indicates connection between adapter 800 and plug 320. Signal generation unit 850 may be a control device having a CPU or may be a control circuit exhibiting a desired function. When signal generation unit 850 requires a power supply voltage for driving, the power supply voltage is supplied from the battery (not shown) incorporated in adapter 800.

Based on signal CNCT2 from signal generation unit 850, CCID control unit 610 determines whether or not charging cable 300 and adapter 800 are connected to each other. When determining that charging cable 300 and adapter 800 are connected to each other, CCID control unit 610 outputs pilot signal CPLT to vehicle ECU 170 using a frequency and/or a potential different from those during external charging. Consequently, CCID control unit 610 can cause vehicle ECU 170 to perform a power feeding operation.

Leakage generation circuit 860 includes a switch SW10 serving as a switching unit and a resistance R30. Switch SW10 serves as a switch, for example, having two contacts CN1 and CN2. One of contacts CN1 and CN2 is closed as switch SW10 is operated.

Contact CN1 has one end connected to a power transmission path leading to power line ACL1 within adapter 800 and the other end connected to a ground line. When contact CN1 is closed, the power transmission path leading to power line ACL1 and the ground line are connected through resistance R30. Accordingly, when contact CN1 is closed while a current flows through this power transmission path, a leakage state is to occur. On the other hand, both ends of contact CN2 are connected to the ground line.

In the state where adapter 800 is not connected to plug 320 or the state where adapter 800 and plug 320 are not completely fitted to each other, switch SW10 is brought into the state where contact CN1 is closed and contact CN2 is opened. Then, when plug 320 is completely fitted to adapter 800, switch SW10 is operated by operation member 322 provided in plug 320, so that contact CN1 is opened and contact CN2 is closed.

In such a configuration of leakage generation circuit 860, since contact CN1 is opened in the state where adapter 800 and plug 320 are completely fitted to each other, a leakage state does not occur even if vehicle 10 supplies electric power to electrical device 700. On the other hand, when adapter 800 and plug 320 are not completely fitted to each other, a leakage state is brought about by closing contact CN1. At this time, the leakage state is detected by leakage detector 608 included in CCID 330 described above. Then, in response to a leakage detection signal LKG from leakage detector 608, CCID control unit 610 opens CCID relay 332, thereby cutting off the electric power to electrical device 700.

Therefore, when a user removes adapter 800 during power feeding to outside, a leakage state occurs in the timing in which adapter 800 and plug 320 become incompletely fitted to each other in the process of removing adapter 800, with the result that power feeding is stopped. Accordingly, when adapter 800 is removed, the terminal unit of plug 320 can be brought into a state where a voltage is not applied thereto.

In addition, switch SW10 is not limited to such a configuration having two contacts as shown in FIG. 7 as long as it is configured to switch between connection and disconnection between the power transmission path within adapter 800 and the ground. For example, switch SW10 may be configured to have one contact without having contact CN2 in FIG. 7.

Figure 8:
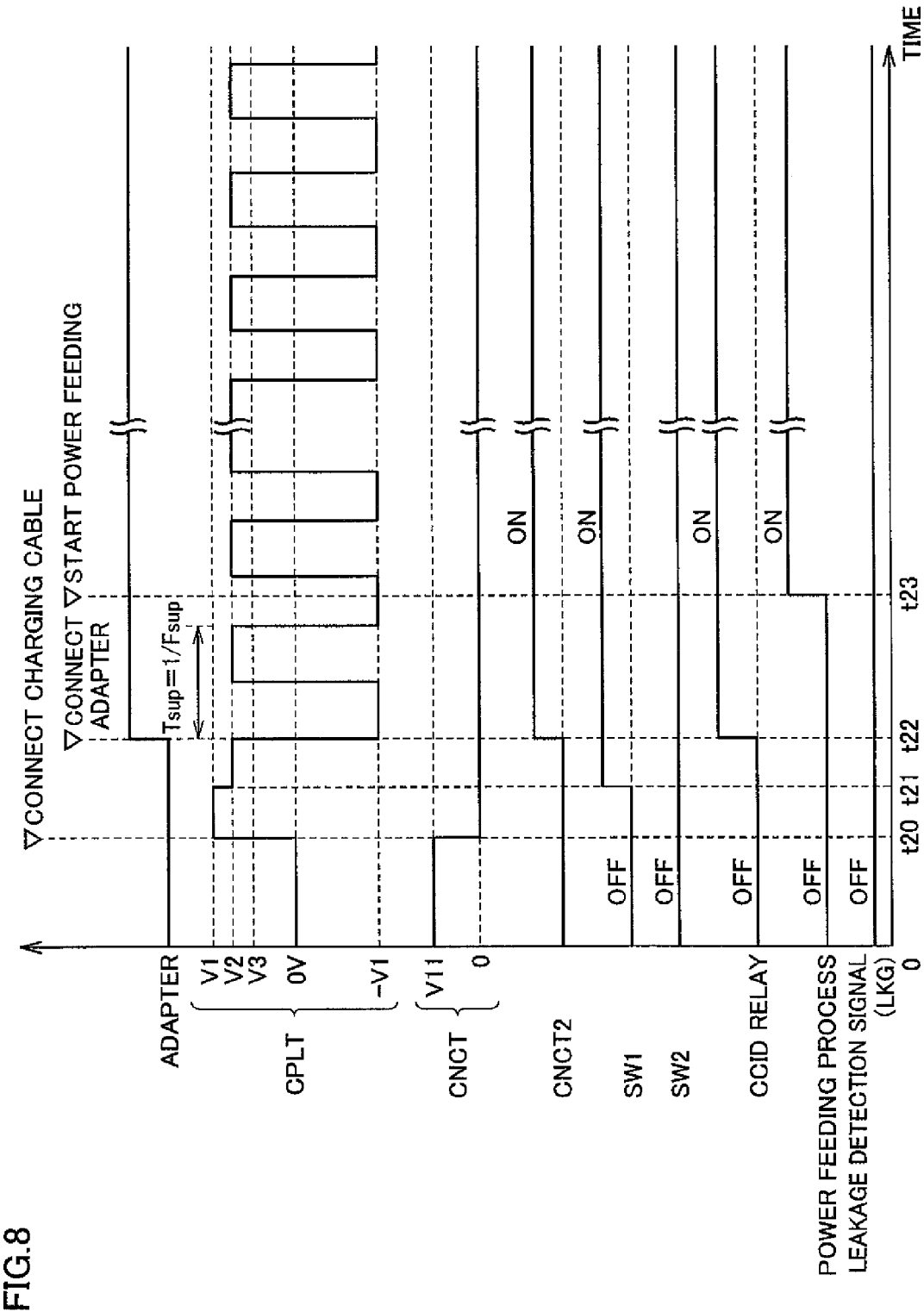
FIG. 8 is a time chart for illustrating control during power feeding in the first embodiment.
Figure 9:
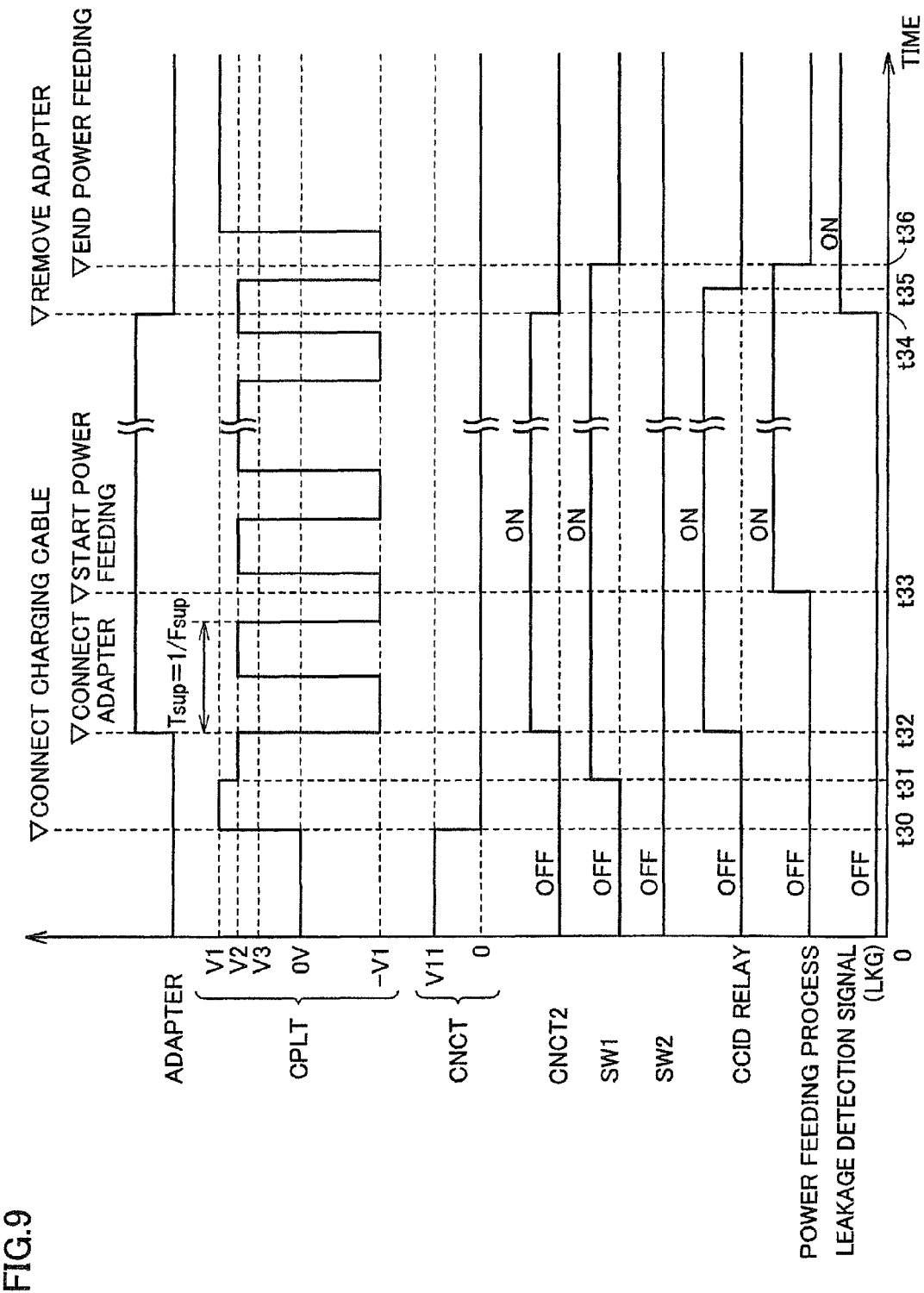
FIG. 9 is a time chart for illustrating control when the adapter is removed during power feeding in the first embodiment.

FIGS. 8 and 9 each are a time chart for illustrating control during power feeding in the first embodiment. In this case, FIG. 8 is a time chart in the normal case where an adapter is not removed during power feeding to outside, and FIG. 9 is a time chart in the case where an adapter is removed during power feeding to outside. In each of FIGS. 8 and 9, the horizontal axis shows time while the vertical axis shows the connection state of adapter 800, a potential of pilot signal CPLT, a potential of connection signal CNCT, the state of a connection signal CNCT2, the states of switches SW1 and SW2, the state of CCID relay 332, the state of executing the power feeding process, and the state of leakage detection signal LKG from leakage detector 608.

Referring to FIGS. 7 and 8, charging cable 300 is not connected to inlet 270 until time t20. In this state, switches SW1, SW2 and CCID relay 332 are in the OFF state while the potential of pilot signal CPLT is 0V. Furthermore, the potential of connection signal CNCT is V11 (>0V) while connection signal CNCT2 is in the OFF state.

At time t20, when charging cable 300 is connected to inlet 270, CCID 330 generates pilot signal CPLT. At this time t20, the potential of pilot signal CPLT is V1 (for example, 12V) and pilot signal CPLT is in a non-oscillation state.

Furthermore, when charging cable 300 is connected, the potential of connection signal CNCT is decreased by connection detecting circuit 312. CPU 508 detects that the potential of connection signal CNCT is decreased, thereby detecting that charging cable 300 is connected to inlet 270. In response to this, CPU 508 activates control signal S1 to thereby turn on switch SW1 (time t21). Then, as described with reference to FIG. 3, the potential of pilot signal CPLT is decreased to V2 (for example, 9V) by pull-down resistance R1 of resistance circuit 502.

At time t22, when plug 320 of charging cable 300 is connected to adapter 800, connection signal CNCT2 is brought into the ON state by signal generation unit 850 of adapter 800. Thereby, CCID control unit 610 recognizes that plug 320 of charging cable 300 has been connected to adapter 800. In response to this, CCID control unit 610 causes pilot signal CPLT to oscillate in an oscillation cycle Tsup (=1/Fsup) longer than an oscillation cycle Tchr in the case of external charging in FIG. 3, that is, Tchr<Tsup (Fchr>Fsup). Furthermore, at time t22, CCID control unit 610 closes CCID relay 332.

CPU 508 detects that pilot signal CPLT has been oscillated. However, as described above, since an oscillation frequency Fsup of pilot signal CPLT output from CCID 330 during the power feeding operation is lower than an oscillation frequency Fchr during the charging operation, CPU 508 recognizes based on this difference between the oscillation frequencies that adapter 800 has been connected to charging cable 300 and that the power feeding operation has been instructed.

Then, CPU 508 closes the contact of relay 155 while controlling power conversion device 160 (FIG. 1), thereby starting to supply electric power from power storage device 150 (FIG. 1) (time t23).

In this state, the terminal unit (terminal unit 806 in FIG. 5) within adapter 800 is being applied with a voltage similarly to the normal receptacle. Accordingly, electric power is supplied to electrical device 700 by connecting electrical device 700 to adapter 800. In FIG. 8, since adapter 800 is not removed, a leakage state is not detected by leakage detector 608. Therefore, leakage detection signal LKG is remained OFF.

Referring to FIG. 9, since the graphs until time t33 are the same as those until time 23 in FIG. 8, the description thereof will not be repeated. On the other hand, after time t33, electric power from power storage device 150 is supplied to adapter 800 through charging cable 300. Thus, it becomes possible to use electrical device 700 by connecting electrical device 700 to adapter 800.

Hereinafter described will be the case where, at time t34, adapter 800 is removed by the user during power feeding from power storage device 150 to electrical device 700. As described with reference to FIG. 7, when adapter 800 and plug 320 become incompletely fitted to each other in the process of removing adapter 800, a leakage state is brought about by leakage generation circuit 860 in adapter 800. Then, leakage detector 608 within CCID 330 detects this leakage state, and leakage detection signal LKG is set to be ON.

In response to that leakage detection signal LKG is turned ON, CCID control unit 610 opens CCID relay 332 to cut-off the electric power to adapter 800 (time t35).

Furthermore, since connection signal CNCT2 is turned OFF by removing adapter 800, CCID control unit 610 stops oscillation of pilot signal CPLT. Consequently, the charging process of vehicle ECU 170 is stopped (time t36).

In this way, by bringing about a leakage state when the adapter is removed during external charging, the electric power to the plug of the charging cable can be immediately cut off by the time when the power feeding process of the vehicle is stopped.

Figure 10:
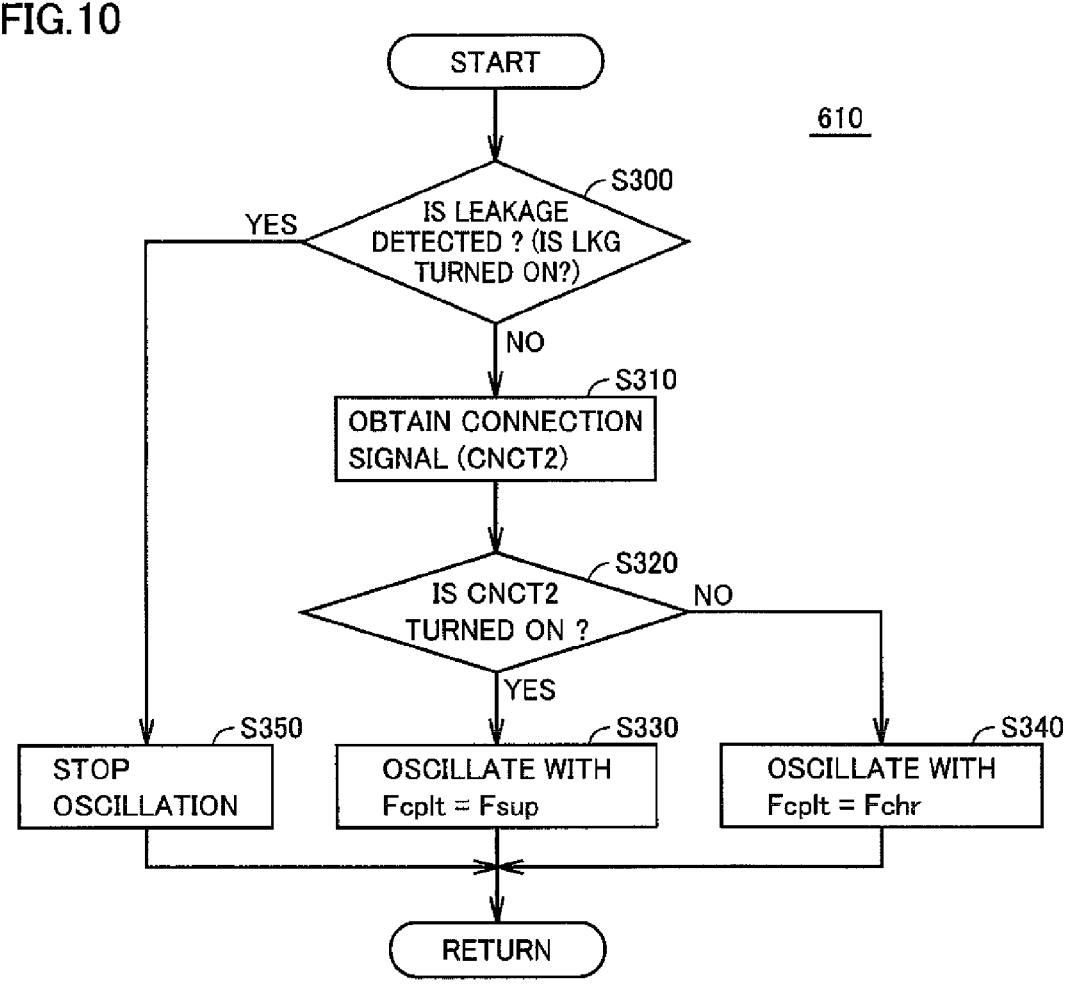
FIG. 10 is a flowchart for illustrating a control process for oscillating a pilot signal that is performed in a CCID control unit in the first embodiment.

FIG. 10 is a flowchart for illustrating a control process for oscillating pilot signal CPLT that is performed in CCID control unit 610 in the first embodiment. In the flowchart in FIG. 10, the process is implemented by executing the program stored in CCID control unit 610 in advance in predetermined cycles. Alternatively, the process may also be implemented for a part of the steps by constructing dedicated hardware (electronic circuit).

Referring to FIGS. 7 and 10, in step (which will be hereinafter abbreviated as S) 300, CCID control unit 610 determines whether or not the leakage state is detected by leakage detector 608, that is, whether or not leakage detection signal LKG is turned ON.

When the leakage state is not detected (NO in S300), the process proceeds to S310, in which CCID control unit 610 obtains connection signal CNCT2. Then in S320, CCID control unit 610 determines whether or not connection signal CNCT2 is ON, that is, whether or not charging cable 300 and adapter 800 are connected to each other.

When connection signal CNCT2 is OFF (NO in S320), CCID control unit 610 recognizes that adapter 800 is not connected to charging cable 300 and the normal external charging mode is employed. Then, in S340, CCID control unit 610 sets an oscillation frequency Fcplt of pilot signal CPLT at frequency Fchr for performing external charging, and causes pilot signal CPLT to oscillate.

On the other hand, when connection signal CNCT2 is ON (YES in S320), CCID control unit 610 recognizes that adapter 800 is connected to charging cable 300 and the mode for power feeding to outside is employed. Then, in S330, CCID control unit 610 sets oscillation frequency Fcplt of pilot signal CPLT at frequency Fsup lower than frequency Fchr during external charging (Fsup<Fchr), and causes pilot signal CPLT to oscillate.

Furthermore, when leakage is detected (YES in S300), the process proceeds to S350, in which CCID control unit 610 stops oscillation of pilot signal CPLT. Thereby, CCID control unit 610 stops the power feeding operation of vehicle ECU 170.

Figure 11:
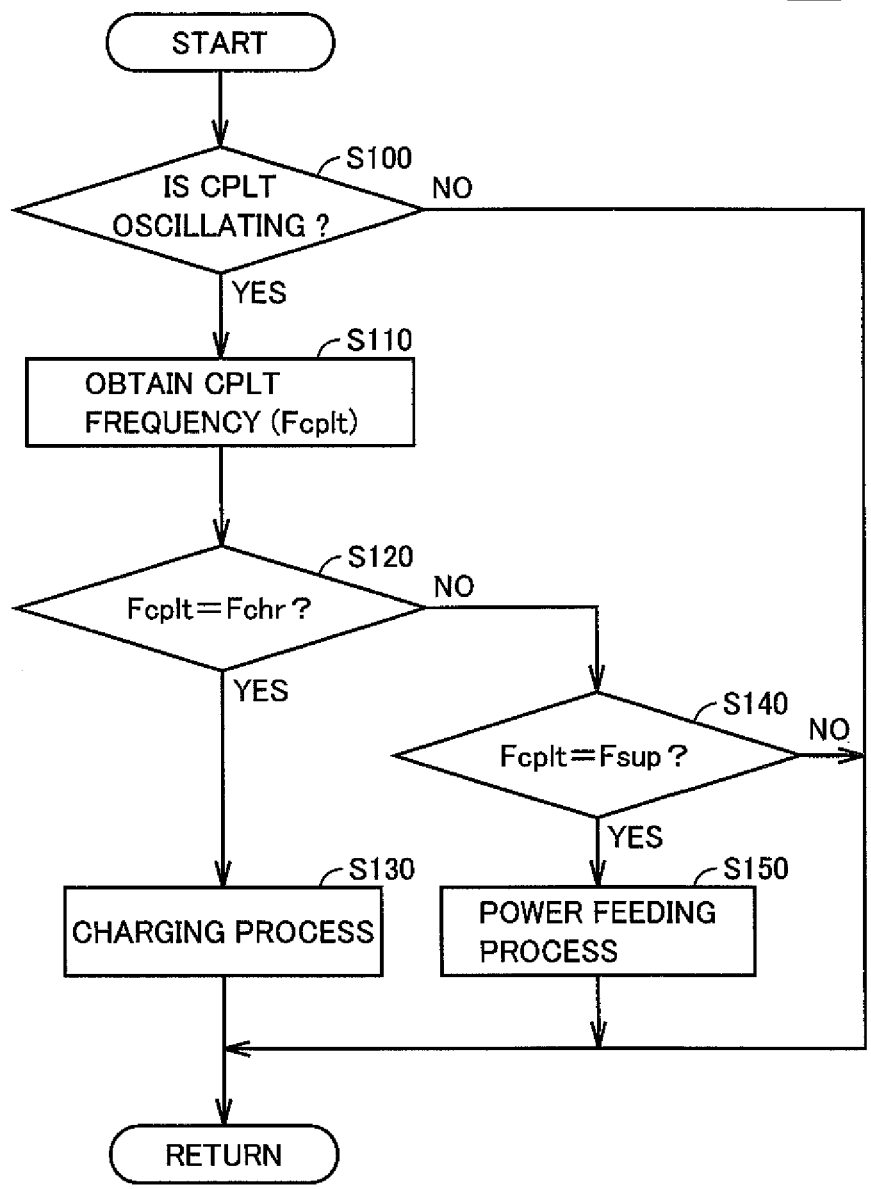
FIG. 11 is a flowchart for illustrating a control process for switching between a charging process and a power feeding process that are performed in a vehicle ECU in the first embodiment.

FIG. 11 is a flowchart for illustrating a control process for switching between the charging process and the power feeding process that are performed in vehicle ECU 170 in the first embodiment. In the flowchart in FIG. 11, the process is implemented by executing the program stored in CPU 508 of vehicle ECU 170 in advance in predetermined cycles. Alternatively, the process may also be implemented for a part of the steps by constructing dedicated hardware (electronic circuit).

Referring to FIGS. 7 and 11, CPU 508 determines in S100 whether or not pilot signal CPLT is oscillating.

When pilot signal CPLT is not oscillating (NO in S100), charging cable 300 is not connected to inlet 270, and therefore, CPU 508 ends the process.

When pilot signal CPLT is oscillating (YES in S100), CPU 508 recognizes that charging cable 300 is connected to inlet 270, and in S110, obtains oscillation frequency Fcplt of pilot signal CPLT.

Then, CPU 508 determines in S120 whether or not the obtained oscillation frequency Fcplt is equal to oscillation frequency Fchr in the case of the charging operation. It is to be noted that, in determination performed in S120, the obtained oscillation frequency Fcplt does not need to be completely equal to oscillation frequency Fchr during the charging operation, and the difference between oscillation frequency Fcplt and oscillation frequency Fchr only needs to fall within a prescribed range ($|Fcplt-Fchr|<\alpha 1$).

When oscillation frequency Fcplt is equal to oscillation frequency Fchr (YES in S120), CPU 508 recognizes that adapter 800 is not connected to charging cable 300. Then, the process proceeds to S130, in which CPU 508 performs a charging process as described with reference to FIG. 3.

On the other hand, when oscillation frequency Fcplt is not equal to oscillation frequency Fchr (NO in S120), the process proceeds to S140, in which CPU 508 determines whether or not the obtained oscillation frequency Fcplt is equal to oscillation frequency Fsup during the power feeding operation. Also in this case, similarly to the case of determination in S120, the obtained oscillation frequency Fcplt does not need to be completely equal to oscillation frequency Fsup during the power feeding operation, and the difference between oscillation frequency Fcplt and oscillation frequency Fsup only needs to fall within a prescribed range ($|Fcplt-Fsup|<\alpha 2$).

When oscillation frequency Fcplt is equal to oscillation frequency Fsup (YES in S140), CPU 508 recognizes that adapter 800 is connected to charging cable 300. Then, the process proceeds to S150, in which the power feeding process as described with reference to FIG. 8 is performed.

On the other hand, when oscillation frequency Fcplt is not equal to oscillation frequency Fsup (NO in S140), CPU 508 cannot determine whether the charging operation or the power feeding operation is performed, and therefore, ends the process.

By performing control in accordance with the above-described processes, in the externally chargeable vehicle, the electric power can be supplied, using a conversion adaptor for a charging cable, from the vehicle to the electrical device external to the vehicle through the charging cable. Furthermore, when the adapter is removed during power feeding to outside, this power feeding can be immediately stopped by the operation of the leakage generation circuit provided in the adapter. This can prevent the exposed terminal unit of the plug of the charging cable from being kept applied with a voltage, so that it becomes possible to suppress deterioration and failures of devices and influences upon the surroundings.

(Modification of Leakage Generation Circuit)

Although it has been described that leakage generation circuit 860 explained with reference to FIG. 7 in the above is configured to cause a leakage state by electrical connection between the power transmission path leading to power line ACL1 of the vehicle and the ground, the manner of causing a leakage state is not limited thereto.

Figure 12:
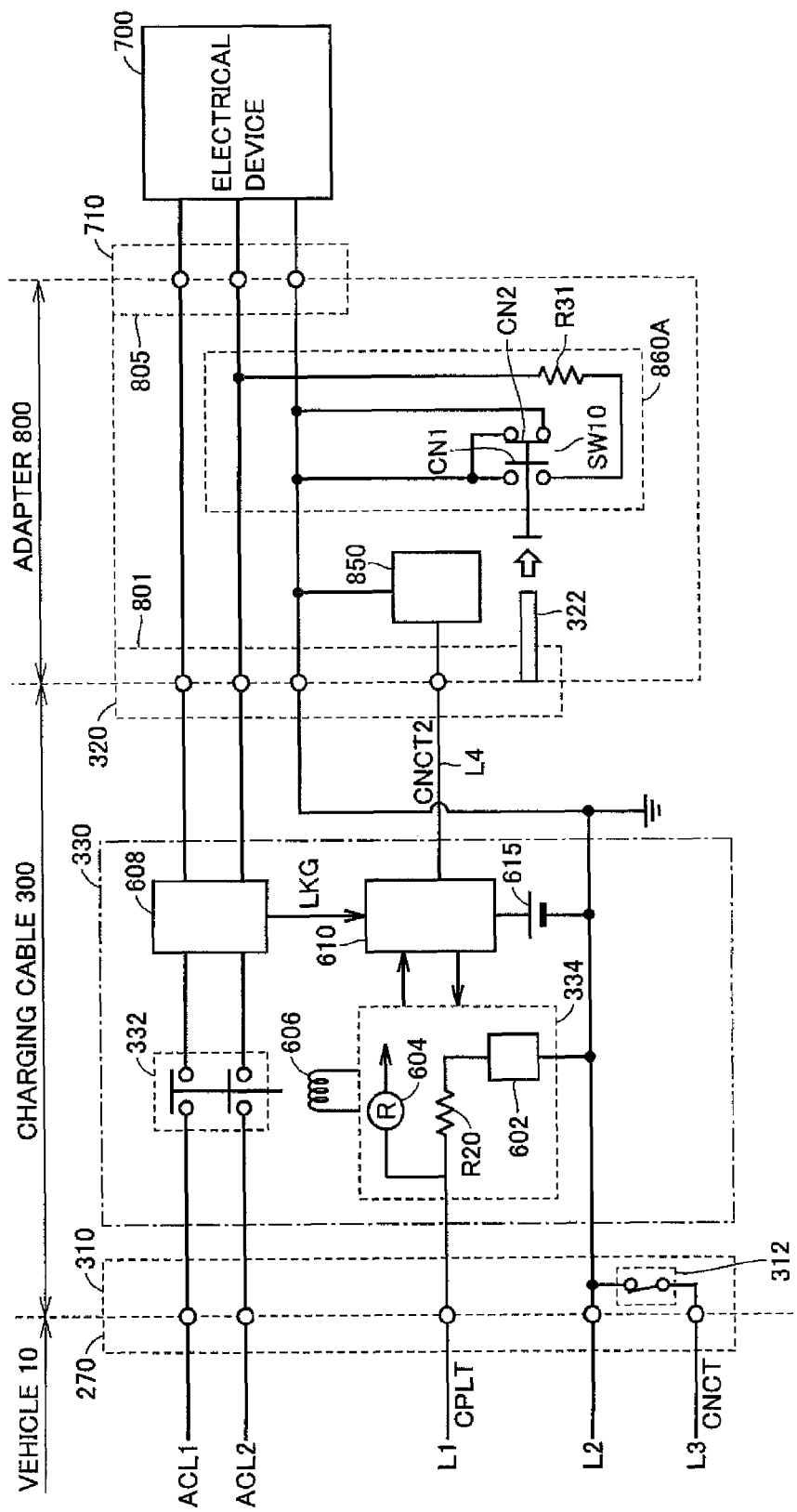
FIG. 12 is a diagram for illustrating the first example of a leakage generation circuit.
Figure 13:
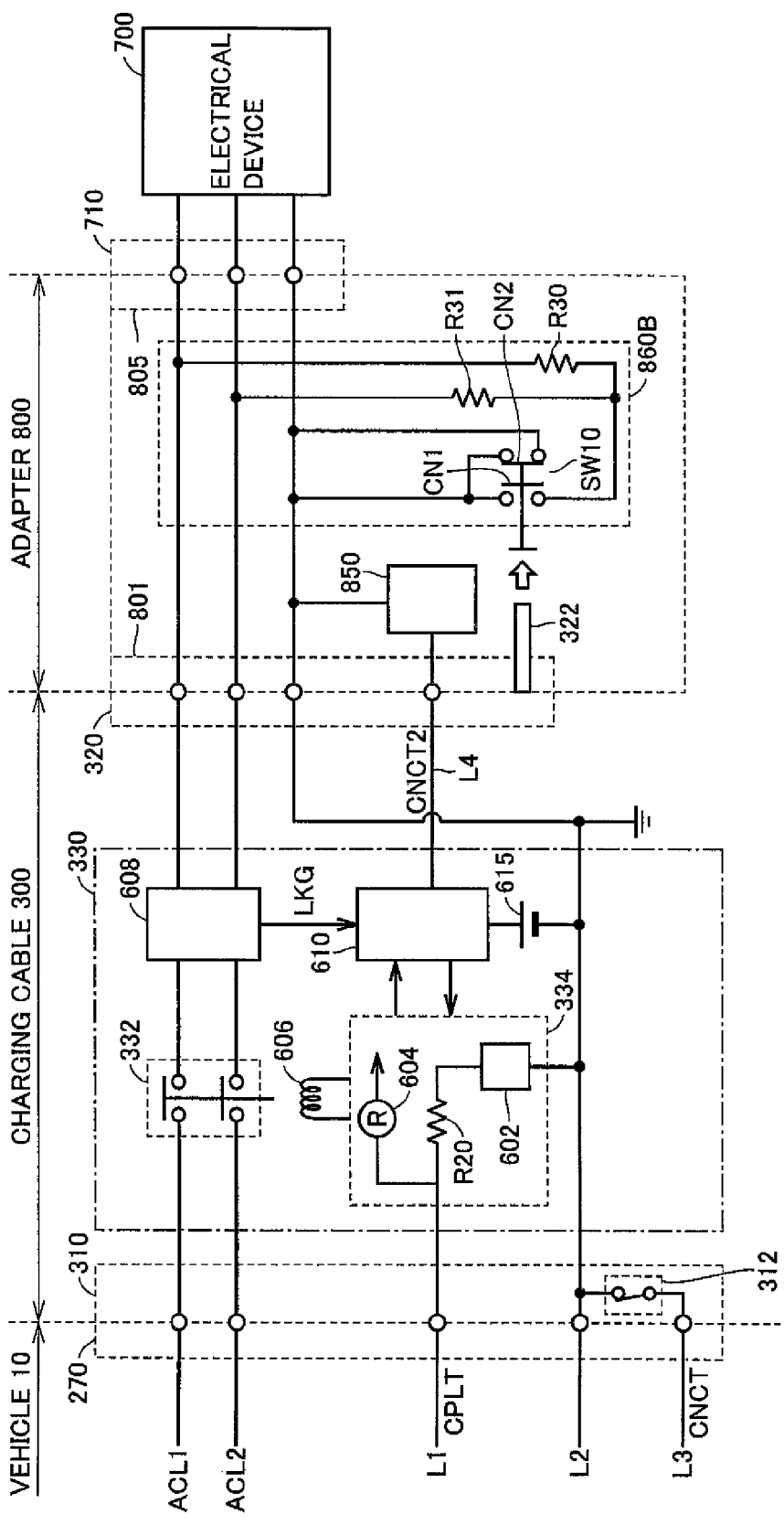
FIG. 13 is a diagram for illustrating the second example of a leakage generation circuit.

For example, as with leakage generation circuit 860A shown in FIG. 12, the other power transmission path, that is, a power transmission path leading to power line ACL2 of the vehicle, may be electrically connected to the ground through a resistance R31. Alternatively, as with leakage generation circuit 860B shown in FIG. 13, both of the power transmission paths may be electrically connected to the ground.

Figure 14:
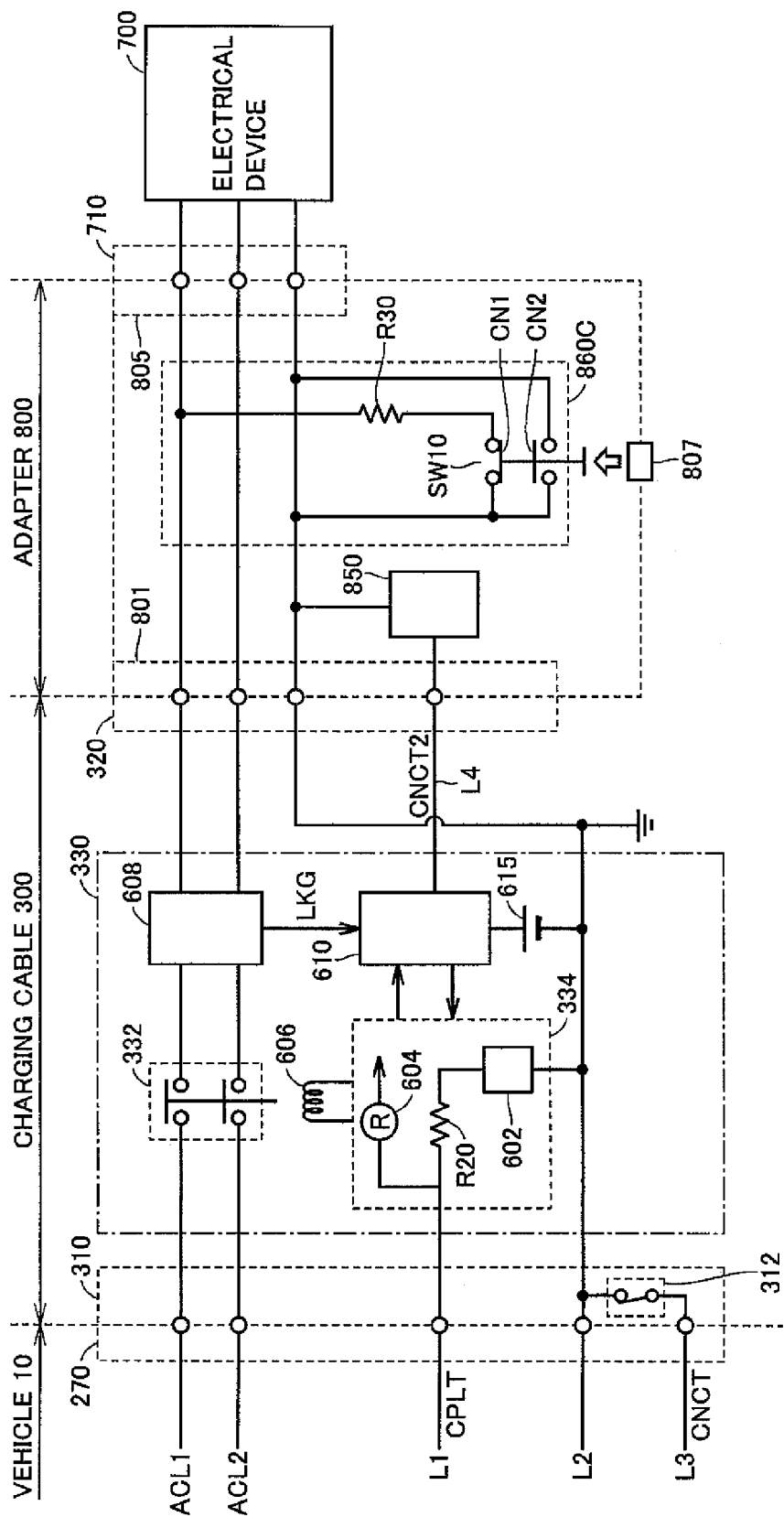
FIG. 14 is a diagram for illustrating the third example of a leakage generation circuit.

Furthermore, in the case where adapter 800 is configured to have locking unit 808 and its operation unit 807, the operation of switch SW10 of the leakage generation circuit may be performed cooperatively with the operation of operation unit 807 for operating locking unit 808 of adapter 800, as with leakage generation circuit 860C shown in FIG. 14. In leakage generation circuit 860C, operation unit 807 is operated to close contact CN2 of switch SW10, thereby bringing about a leakage state.

In such a configuration, when the user removes adapter 800 from plug 320 in the state where adapter 800 and plug 320 are completely fitted to each other (that is, the state where locking unit 808 appropriately engages with plug 320), operation unit 807 is operated without fail. Thus, there is a high possibility that adapter 800 is removed when operation unit 807 is operated. Accordingly, by bringing about a leakage state in response to that operation unit 807 is operated, the power feeding operation can be stopped further immediately.

Second Embodiment

Although the configuration for performing leakage detection in the CCID of the charging cable has been described in the first embodiment, leakage detection can be performed also on the vehicle side.

Figure 15:
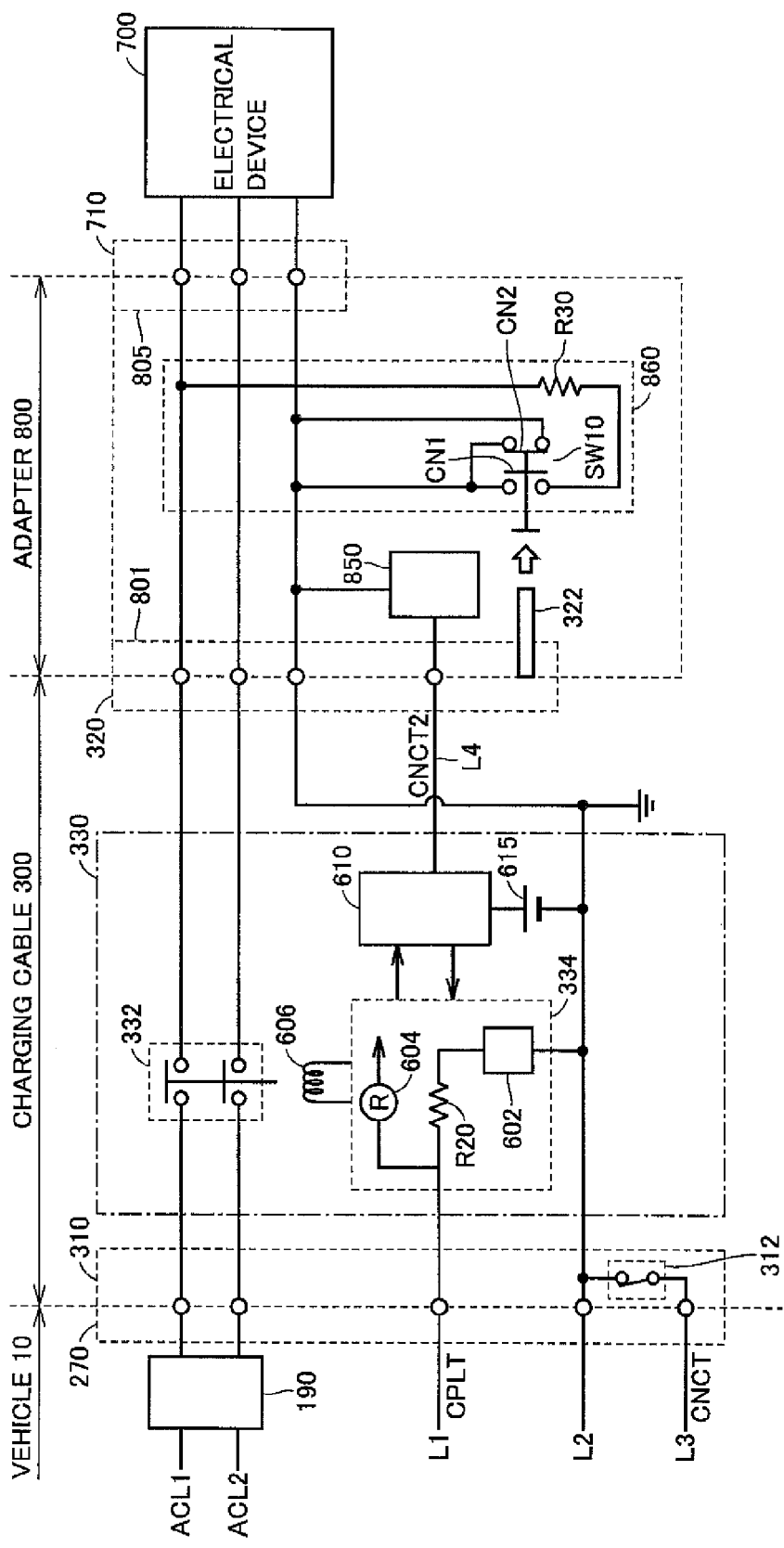
FIG. 15 is a detailed diagram of a circuit in the second embodiment.

FIG. 15 is a detailed diagram of a circuit in the case where power feeding is performed through a charging cable using an adapter in the second embodiment. In FIG. 15, a leakage detector 190 is provided in vehicle 10. For ease of understanding, FIG. 15 does not show a leakage detector 608 within CCID 330 of charging cable 300 unlike in FIG. 7, but a leakage detector may be provided also within CCID 330 like in FIG. 7.

Referring to FIG. 15, leakage detector 190 detects whether or not a leakage state occurs in power lines ACL1 and ACL2. When leakage detector 190 detects a leakage state, vehicle ECU 170 stops the power feeding operation of power conversion device 160 and also controls the potential of pilot signal CPLT using resistance circuit 502, so as to open CCID relay 332 of charging cable 300.

In addition or instead, vehicle ECU 170 opens relay 155 in vehicle 10 to cut off the electric power supplied from power storage device 150 to power conversion device 160. Alternatively, a relay (not shown) used only for cutting off the electric power during leakage may be additionally provided between power conversion device 160 and inlet 270, and this relay may be opened to thereby cut off the electric power.

According to such a configuration, even when the charging cable not having a leakage detector is used, or even when the leakage detector of the charging cable cannot be properly operated due to a failure or the like, power feeding from the vehicle can be appropriately stopped in response to that the adapter is removed from the charging cable.

Third Embodiment

Although the configuration of a charging cable having a CCID has been described in the first and second embodiments, some charging cables may not have a control device such as a CCID.

Figure 16:
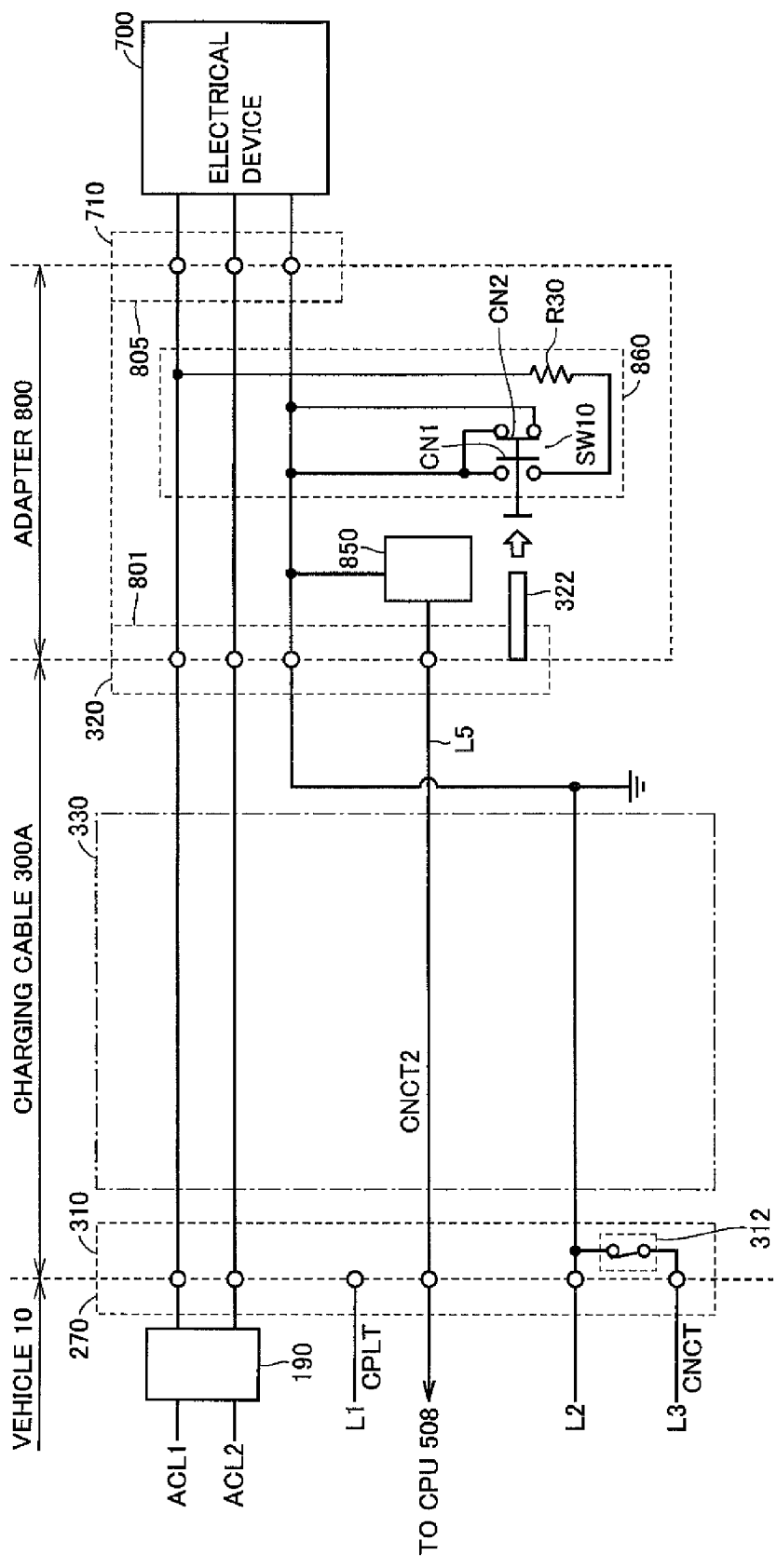
FIG. 16 is a detailed diagram of a circuit in the third embodiment.

FIG. 16 is a detailed diagram of a circuit in the case where a charging cable 300A not having a CCID is used. Referring to FIG. 16, since charging cable 300A does not have a CCID, it is not possible to determine by a CCID whether or not the adapter and the charging cable are connected, and to use a pilot signal CPLT to cause the vehicle to execute the power feeding operation, which is as described in the first embodiment.

Accordingly, in the above-described case, for example, the signal indicating connection from signal generation unit 850 of adapter 800 is directly transmitted to CPU 508 of vehicle ECU 170 using a signal line L5 included in charging cable 300A, to cause vehicle ECU 170 to recognize connection between adapter 800 and charging cable 300A.

Furthermore, in FIG. 16, since a leakage detector is not included in charging cable 300A, the leakage state caused by leakage generation circuit 860 of adapter 800 is detected by leakage detector 190 provided in vehicle 10 as in the second embodiment.

In this way, even if a control device is not provided in the charging cable, the control device on the vehicle side is used to detect connection between the adapter and the charging cable and also detect whether or not a leakage state occurs, and thereby, power feeding to outside can be implemented through the charging cable using the adapter, and also power feeding can be immediately stopped in response to removal of the adapter during power feeding to outside.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

10 vehicle, 20 drive unit, 120 motor generator, 130 driving wheel, 140 engine, 145 power split device, 150 power storage device, 155 relay, 160 power conversion device, 170 vehicle ECU, 180 motor drive device, 182, 604, 650 voltage sensor, 190, 608 leakage detector, 270 inlet, 300, 300A charging cable, 310 connector, 312 connection detecting circuit, 320 plug, 321 concave portion, 322 operation member, 330 CCID, 332 CCID relay, 334 control pilot circuit, 340, 340A, 340B power line unit, 341, ACL1, ACL2 power line, 400 receptacle, 402 external power supply, 502 resistance circuit, 504, 506 input buffer, 511 power supply node, 512 vehicle ground, 602 oscillation device, 606 electromagnetic coil, 610 CCM control unit, 615 battery, 660 current sensor, 700 electrical device, 710 power supply plug, 800 adapter, 801, 805 connection unit, 802, 806 terminal unit, 803 insertion hole, 807 operation unit, 808 locking unit, 850 signal generation unit, 860, 860A, 860B, 860C leakage generation circuit, CN1, CN2 contact, L1 control pilot line, L2 ground line, L3 to L5 signal line, R1, R2, R10, R20, R30, R31 resistance, SW1, SW2, SW10 switch.

The invention claimed is:

1. An adapter used for supplying electric power from a power source including a power storage device mounted in a vehicle to an electrical device external to the vehicle through a charging cable, the vehicle being capable of performing external charging that allows the power storage device to be charged using electric power supplied from an external power supply through the charging cable,
   in response to a signal instructing power feeding that is generated by connection between the adapter and the charging cable, the vehicle performing power feeding to the electrical device,
   the adapter comprising:
   a first connection unit capable of connecting a power supply plug connected to the external power supply in the charging cable during external charging;
   a second connection unit electrically connected to the first connection unit and capable of connecting a power supply plug of the electrical device; and
   a leakage generation circuit causing a leakage state in a power transmission path connecting the first connection unit and the second connection unit when the adapter and the charging cable are incompletely fitted to each other.

2. The adapter according to claim 1, wherein the leakage generation circuit is configured to cause the leakage state by electrical connection between at least one power transmission path of the power transmission paths and a ground when the adapter and the charging cable are incompletely fitted to each other.

3. The adapter according to claim 1, wherein
   the charging cable includes a leakage detection circuit for detecting the leakage state, and the charging cable stops outputting the signal instructing the power feeding to the vehicle when the leakage state is detected.

4. The adapter according to claim 3, wherein the charging cable further includes a cut-off circuit for cutting off power feeding to the adapter when the leakage state is detected.

5. The adapter according to claim 1, wherein
the vehicle includes a leakage detection circuit for detecting the leakage state, and
the vehicle stops power feeding to the charging cable when the leakage state is detected.

6. The adapter according to claim 2, wherein
the leakage generation circuit includes a switching unit configured to switch between connection and disconnection between the power transmission path and the ground, and
the switching unit causes all of the power transmission paths to be disconnected from the ground when the adapter and the charging cable are completely fitted to each other, and causes the at least one power transmission path to be electrically connected to the ground when the adapter and the charging cable are incompletely fitted to each other.

7. The adapter according to claim 2, wherein
the charging cable includes a leakage detection circuit for detecting the leakage state, and
the charging cable stops outputting the signal instructing the power feeding to the vehicle when the leakage state is detected.

8. The adapter according to claim 2, wherein
the vehicle includes a leakage detection circuit for detecting the leakage state, and
the vehicle stops power feeding to the charging cable when the leakage state is detected.

9. The adapter according to claim 6, wherein the switching unit is operated by an operation member provided in the power supply plug of the charging cable when the adapter and the charging cable are connected to each other.

10. The adapter according to claim 6, further comprising:
a locking unit configured to engage with the power supply plug of the charging cable when the adapter and the charging cable are completely fitted to each other; and
an operation unit configured to operate the locking unit for releasing the engagement between the power supply plug and the adapter, wherein
the switching unit causes the at least one power transmission path to be electrically connected to the ground in accordance with an operation of the operation unit by a user.

11. The adapter according to claim 6, wherein
the charging cable includes a leakage detection circuit for detecting the leakage state, and
the charging cable stops outputting the signal instructing the power feeding to the vehicle when the leakage state is detected.

12. The adapter according to claim 6, wherein
the vehicle includes a leakage detection circuit for detecting the leakage state, and
the vehicle stops power feeding to the charging cable when the leakage state is detected.

13. The adapter according to claim 9, wherein
the charging cable includes a leakage detection circuit for detecting the leakage state, and
the charging cable stops outputting the signal instructing the power feeding to the vehicle when the leakage state is detected.

14. The adapter according to claim 10, wherein
the charging cable includes a leakage detection circuit for detecting the leakage state, and
the charging cable stops outputting the signal instructing the power feeding to the vehicle when the leakage state is detected.

15. The adapter according to claim 10, wherein
the vehicle includes a leakage detection circuit for detecting the leakage state, and
the vehicle stops power feeding to the charging cable when the leakage state is detected.

16. The adapter according to claim 9, wherein
the vehicle includes a leakage detection circuit for detecting the leakage state, and
the vehicle stops power feeding to the charging cable when the leakage state is detected.

17. A vehicle capable of performing external charging that allows a power storage device mounted therein to be charged using electric power supplied from an external power supply through a charging cable and capable of feeding electric power to an external electrical device by connection of an adapter to the charging cable, the vehicle comprising:
a power source including the power storage device;
an inlet for connecting the charging cable during external charging;
a power conversion device for converting electric power from the power source to supply the converted electric power to the inlet; and
a control device for controlling the power conversion device,
the adapter including
a first connection unit capable of connecting a power supply plug connected to the external power supply in the charging cable during external charging,
a second connection unit electrically connected to the first connection unit and capable of connecting a power supply plug of the electrical device, and
a leakage generation circuit causing a leakage state to occur in a power transmission path connecting the first connection unit and the second connection unit when the adapter and the charging cable are incompletely fitted to each other,
in response to reception of a signal instructing power feeding that is generated by connection between the adapter and the charging cable, the control device driving the power conversion device to supply the electric power from the power source to the electrical device, and
the control device stopping power feeding to the electrical device when the leakage state is detected.

* * * * *